US012656112B2

(12) United States Patent
     Tauriac

(10) Patent No.: US 12,656,112 B2
(45) Date of Patent: Jun. 16, 2026

(54) WATER BUOY DATA SYSTEM TO STABILIZE AN OFF-SHORE VESSEL

(71) Applicant: John W. Tauriac, Santa Cruz, CA (US)

(72) Inventor: John W. Tauriac, Santa Cruz, CA (US)

( * ) Notice: Subject to any disclaimer, the term of this patent is extended or adjusted under 35 U.S.C. 154(b) by 315 days.

(21) Appl. No.: 18/503,438

(22) Filed: Nov. 7, 2023

(65) Prior Publication Data

US 2024/0067314 A1    Feb. 29, 2024

Related U.S. Application Data

(63) Continuation of application No. 17/073,201, filed on Oct. 16, 2020, now Pat. No. 11,851,146, which is a
    (Continued)

(51) Int. Cl.
     *G01C 13/00*       (2006.01)
     *B63B 21/24*       (2006.01)
     (Continued)

(52) U.S. Cl.
     CPC ............ *G01C 13/002* (2013.01); *B63B 21/24*
         (2013.01); *B63B 22/04* (2013.01); *B63B 22/18*
                                                (2013.01);
     (Continued)

(58) Field of Classification Search
     None
     See application file for complete search history.

(56) References Cited

U.S. PATENT DOCUMENTS 3,455,159 A    7/1969  Gies
6,847,326 B2   1/2005  Harigae et al.
               (Continued)

FOREIGN PATENT DOCUMENTS

CN      202929209 U    5/2013
CN      106555727 B    6/2022
               (Continued)

OTHER PUBLICATIONS

International Search Report and Written Opinion mailed Jul. 18, 2019; International Application No. PCT/US19/27644; John W. Tauriac, 9 pages.
(Continued)

*Primary Examiner* — Eric S. McCall
*Assistant Examiner* — Nigel H Plumb
(74) *Attorney, Agent, or Firm* — PERKINS COIE LLP

(57) ABSTRACT

A water buoy data system stabilizes an offshore vessel. Water buoys sense wind characteristics and water characteristics at a location of the vessel. The water buoys wirelessly transfer data messages that indicate the wind characteristics and water characteristics at the location of the vessel for delivery to a computer system. The computer system receives the data messages wirelessly transferred by the water buoys that indicate the wind characteristics and the water characteristics at the location of the vessel. The computer system determines wave forces based on the wind characteristics and the water characteristics at the location of the vessel. The computer system indicates the wave forces to control vessel engine thrusters to counter the wave forces and stabilize the vessel.

20 Claims, 18 Drawing Sheets

Related U.S. Application Data continuation of application No. PCT/US2019/027644, filed on Apr. 16, 2019, which is a continuation of application No. 15/974,570, filed on May 8, 2018, now Pat. No. 10,852,134.

(60) Provisional application No. 62/658,542, filed on Apr. 16, 2018, provisional application No. 62/503,165, filed on May 8, 2017.

(51) Int. Cl.

| | |
|---|---|
| *B63B 22/04* | (2006.01) |
| *B63B 22/18* | (2006.01) |
| *B63B 79/15* | (2020.01) |
| *F03B 13/14* | (2006.01) |
| *F03B 13/18* | (2006.01) |
| *F03B 13/26* | (2006.01) |
| *G06F 15/76* | (2006.01) |
| *G06N 20/00* | (2019.01) |
| *H04W 4/38* | (2018.01) |
| *G06Q 10/40* | (2026.01) |
| *H04W 4/90* | (2018.01) |

(52) U.S. Cl.

CPC ............ *B63B 79/15* (2020.01); *F03B 13/145* (2013.01); *F03B 13/1865* (2013.01); *F03B 13/262* (2013.01); *G06F 15/76* (2013.01); *G06N 20/00* (2019.01); *H04W 4/38* (2018.02); *B63B 2201/00* (2013.01); *B63B 2205/00* (2013.01); *B63B 2207/00* (2013.01); *B63B 2209/14* (2013.01); *G06Q 10/40* (2026.01); *H04W 4/90* (2018.02)

(56) References Cited

U.S. PATENT DOCUMENTS

| | | | |
|---|---|---|---|
| 7,613,072 | B2 | 11/2009 | Lohrmann et al. |
| 8,195,395 | B2 | 6/2012 | Teng et al. |
| 8,279,714 | B2 | 10/2012 | Paul et al. |
| 8,423,487 | B1 | 4/2013 | Rubin |
| 9,014,983 | B1 | 4/2015 | Uy |
| 9,223,058 | B1 | 12/2015 | Uy |
| 9,291,453 | B2 | 3/2016 | White et al. |
| 9,726,143 | B2 | 8/2017 | Wu et al. |
| 9,777,701 | B2 | 10/2017 | Alam et al. |
| 9,792,802 | B2 | 10/2017 | Kirk |

| | | | |
|---|---|---|---|
| 10,412,950 | B2 | 9/2019 | Opshaug |
| 10,488,554 | B2 | 11/2019 | Pierik et al. |
| 10,520,646 | B2 | 12/2019 | Derr et al. |
| 10,583,898 | B2 | 3/2020 | Moffat et al. |
| 10,654,544 | B2 | 5/2020 | Opshaug |
| 10,668,990 | B2 | 6/2020 | Sheldon-Coulson et al. |
| 10,767,618 | B2 | 9/2020 | Lehmann et al. |
| 10,852,134 | B2 | 12/2020 | Tauriac |
| 11,390,360 | B2 | 7/2022 | Opshaug |
| 11,401,910 | B2 | 8/2022 | Boren et al. |
| 11,440,625 | B2 | 9/2022 | Moffat et al. |
| 11,815,060 | B2 | 11/2023 | Boren et al. |
| 11,851,146 | B2 | 12/2023 | Tauriac |
| 2006/0005617 | A1 | 1/2006 | LeMieux |
| 2009/0303322 | A1 | 12/2009 | Harper |
| 2010/0228401 | A1 | 9/2010 | Hench |
| 2010/0302908 | A1 | 12/2010 | Strong |
| 2010/0326343 | A1 | 12/2010 | Hunt |
| 2011/0089696 | A1 | 4/2011 | Davis et al. |
| 2014/0033963 | A1* | 2/2014 | Szydlowski .......... B63B 35/285 114/74 R |
| 2015/0025804 | A1 | 1/2015 | Jones et al. |
| 2015/0185007 | A1 | 7/2015 | Deshetler Brinton et al. |
| 2015/0217837 | A1* | 8/2015 | Szydlowski .......... B63B 35/285 114/74 R |
| 2016/0025883 | A1 | 1/2016 | Lambert et al. |
| 2016/0047651 | A1* | 2/2016 | White ................... A61B 5/681 702/3 |
| 2016/0202057 | A1* | 7/2016 | White .................. H04W 4/023 700/91 |
| 2016/0306833 | A1 | 10/2016 | Esposito |
| 2016/0359570 | A1 | 12/2016 | Felemban et al. |
| 2021/0277863 | A1 | 9/2021 | Lehmann et al. |

FOREIGN PATENT DOCUMENTS

| | | | |
|---|---|---|---|
| CN | 111355403 | B | 4/2023 |
| KR | 20180077651 | A | 7/2018 |
| WO | 2011065838 | A1 | 6/2011 |
| WO | 2012044100 | A2 | 4/2012 |

OTHER PUBLICATIONS

"Piezoelectric Ribbon Sensor", https://www.adafruit.com/product/4931, accessed on May 7, 2024, 6 pages.

Jbaily et al., "Piezoelectric devices for ocean energy: a brief survey", Journal of Ocean Engineering and Marine Energy, 2015, vol. 1, pp. 101-118.

* cited by examiner

1400

Transmitting, to a remote server, user preferences    1410

Transmitting, to the remote server, a user request    1420

Receiving, from the remote server and in response to the user request, a message based on the user preferences and information corresponding to the wave conditions    1430

WATER BUOY DATA SYSTEM TO STABILIZE AN OFF-SHORE VESSEL

CROSS REFERENCE TO RELATED APPLICATIONS

This United States Patent Application is a continuation of U.S. patent application Ser. No. 17/073,201 that was filed on Oct. 16, 2020 and is entitled "REAL-TIME WAVE MONITORING AND SENSING METHODS AND SYSTEMS." U.S. patent application Ser. No. 17/073,201 is a continuation of international Patent Application PCT/US2019/027644 that was filed on filed on Apr. 16, 2019 and is entitled "Real-Time Wave Monitoring and Sensing Methods and Systems." International Patent Application PCT/US2019/027644 claims the benefit of U.S. Pat. No. 10,852,134 B2 that was filed on May 8, 2018 and is entitled "REAL-TIME WAVE MONITORING AND SENSING METHODS AND SYSTEMS." U.S. Pat. No. 10,852,134 B2 claims the benefit of U.S. Provisional Patent Application 62/503,165 that was filed on May 8, 2017 and is entitled "Remote Information Peak Sensing Distributive Data Operations." U.S. Pat. No. 10,852,134 B2 also claims the benefit of U.S. Provisional Patent Application 62/658,542 that was filed on Apr. 16, 2018 and is entitled "Remote Information Peak Sensing Methods and Systems." U.S. patent application Ser. No. 17/073,201, International Patent Application PCT/US2019/027644, U.S. Pat. NO. 10,852,134 B2, U.S. Provisional Patent Application 62/503,165, and U.S. Provisional Patent Application 62/658,542 are hereby incorporated by reference into this United States Patent Application.

TECHNICAL FIELD

This document relates to methods and systems for real-time monitoring and sensing of wave characteristics, ocean currents, water velocity, and the like.

BACKGROUND

At the entrance of most beaches, there is a bulletin board with notices about water conditions: a faded sign warning about rip currents and a list of this week's tide tables. However, the bulletin board is typically of limited utility since the posted surf and water quality reports are produced by meteorologists using time-lapsed data, which may not be pertinent for that particular beach and for that particular time.

As such, existing systems do not provide real-time updates of wave conditions to users who wish to access the beach for leisure and sporting activities, and may not warn visitors to the presence of rip currents in the neighboring waters in real-time.

SUMMARY

In some examples, a water buoy data system is configured and operates to stabilize an offshore vessel as follows. Water buoys sense wind characteristics and water characteristics at a location of the vessel. The water buoys wirelessly transfer data messages that indicate the wind characteristics and water characteristics at the location of the vessel for delivery to a computer system. The computer system receives the data messages wirelessly transferred by the water buoys that indicate the wind characteristics and the water characteristics at a location of the vessel. The computer system determines wave forces based on the wind characteristics and the water characteristics at the location of the vessel. The computer system indicates the wave forces to control vessel engine thrusters to counter the wave forces and stabilize the vessel.

In some examples, a water buoy data system is configured and operates to stabilize an offshore vessel as follows. Water buoys sense wind characteristics and water characteristics at a location of the vessel. The water buoys wirelessly transfer data messages that indicate the wind characteristics and water characteristics at the location of the vessel for delivery to a computer system. The computer system receives the data messages wirelessly transferred by the water buoys that indicate the wind characteristics and the water characteristics at the location of the vessel. The computer system determines pitch wave forces and roll wave forces based on the wind characteristics and the water characteristics at the location of the vessel. The computer system indicates the pitch wave forces and roll wave forces to control vessel engine thrusters to counter the pitch wave forces and the roll wave forces and stabilize the vessel.

DETAILED DESCRIPTION

Figure 1:
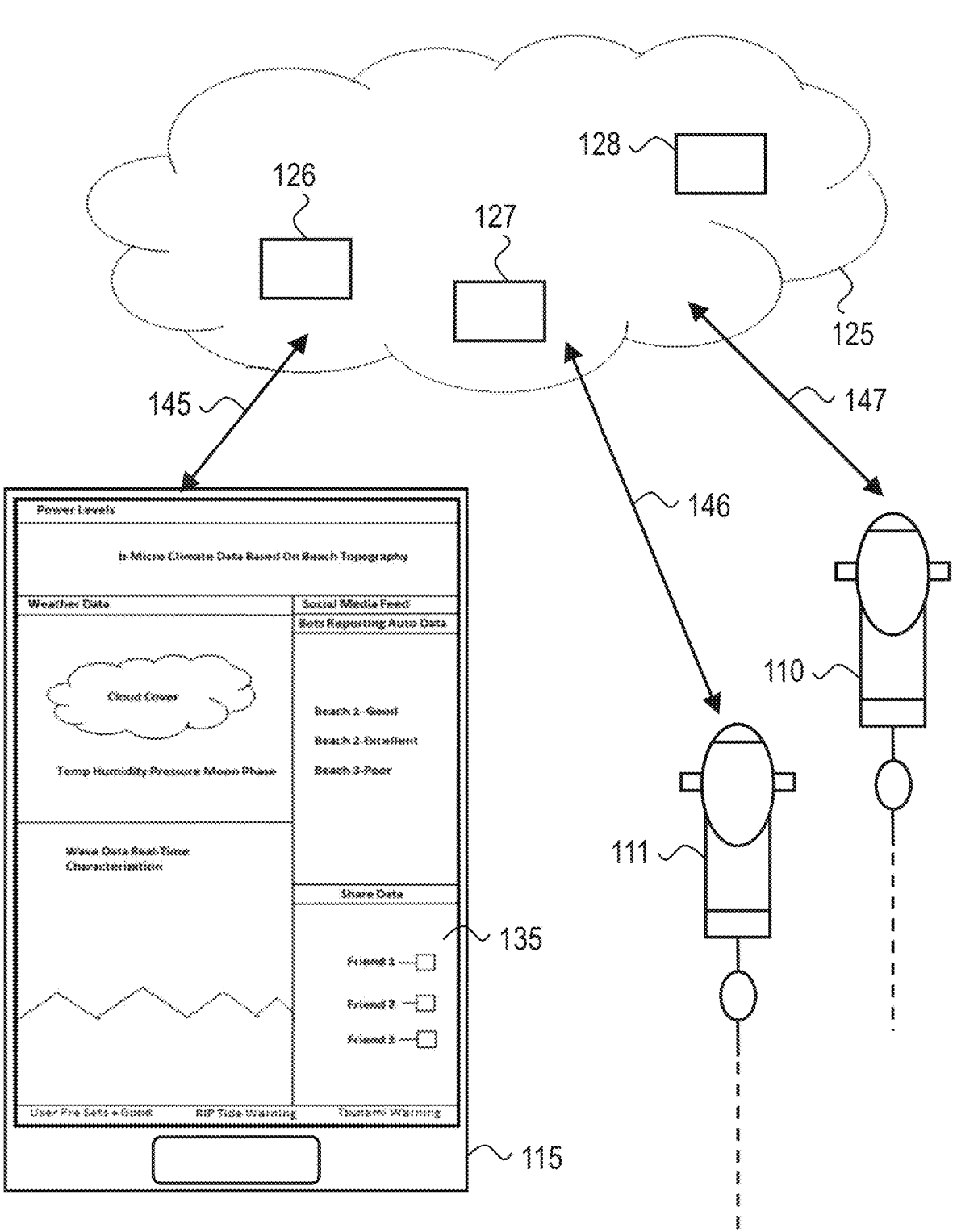
FIG. 1 shows a block diagram of an example system for real-time wave monitoring and sensing, according to embodiments of the disclosed technology.

Coastal marine ecosystems are structured by physical processes. Wave energy, in particular, has important effects on the near-shore structure of coastlines and the productivity of communities. An example of the altering of coastlines and communities may be seen in Santa Cruz, California. The Santa Cruz Harbor suffered ecological and economic damages from shoaling of the harbor mouth and boat slips. The ocean swells carried large amounts of sediment and sand that prevented commercial fishermen from exiting and entering the harbor due to shoaling problems. Measurement techniques used by the harbor master were time consuming and could not accurately measure the sediment build up in time for the dredging vessel to do preventative maintenance to the mouth of the harbor. Another example of the utility of monitoring wave energy is seen in the ability to be able to plan leisure and sporting activities along the hundreds of miles of California coast, such as surfing.

In some existing systems, air and sea surface temperature, as well as wind speed and direction may be monitored using a number of offshore buoys spaced several miles apart (e.g., the National Oceanic and Atmospheric Administration (NOAA) buoy and data collection network). However, the size and cost of the NOAA offshore buoys make them unsuitable for deployment near beaches and surfing environments. Alternatively, currently available buoys that may be deployed near the shore only include simple accelerometer loggers whose data needs to be manually accessed periodically (see, for example, the implementation in U.S. Patent Application Publication No. 2014/0137664, entitled "Inexpensive instrument for measuring wave exposure and water velocity," which is incorporated by reference, in its entirety, as part of the disclosure of this patent document).

Embodiments of the disclosed technology, described in detail in this document include the Remote Information Peak Sensing (RIPS) system that provides a low-cost and low-complexity solution for monitoring wave conditions and measuring wave exposure, and which can be deployed, for example, close to the beach and in surfing environments. The RIPS system is a real-time information system accessible by smart devices and/or web applications. Section headings are used in the present document to improve readability of the description and do not in any way limit the discussion or the embodiments to the respective sections only.

Introduction and Overview

Ocean waves deliver energy to coasts and mold the physical environments impacting the coastal communities. Measuring wave exposure at appropriate spatial scales is fundamental to understanding marine environments. This is a challenge because existing instruments are expensive, difficult to use, or are unable to measure at appropriate temporal scales. Approaches have been made using inexpensive devices designed to measure hydrodynamic force with small drogues and springs, or that measure average water flow through the dissolution of blocks of plaster or gypsum discs, or that use basic accelerometer logging.

Acoustic Doppler velocimeters (ADVs) and acoustic Doppler current profilers (ADCPs) are expensive (typically US$15 K-25 K) and logistically difficult to deploy, requiring the support of vessels with hydraulic hoists for deploying heavy instrument packages. These factors restrict the number of units that can be deployed concurrently, limiting the spatial coverage and resolution of measurements.

Embodiments of the disclosed technology provide a solution in the tradeoff between accuracy and the cost of measuring wave exposure. FIG. 1 shows a block diagram of an example system for real-time wave monitoring and sensing. As shown therein, RIPS buoys (110, 111) are configured to continuously monitor wave conditions. In some embodiments, the RIPS buoy is a submerged float anchored just above the substrate by tether, which moves freely with water motion generated by waves. A sensor array is housed inside a protective housing connected to the float. In one example, records of the tilt of the float and its movement along with associated sensor data is distributed via a subsea data cable (not shown in FIG. 1) connected to the underwater instrument, to a remote server 125 (or data system) that enables real-time data distribution via a wired or wireless internet connection.

In another example, and as shown in FIG. 1, the RIPS buoys (110, 111) can communicate wirelessly to a remote server 125 (e.g., remote data system, cloud computing system, software-as-a-service system). For example, the buoys may use communication links (146, 147) that support protocols including Wi-Fi, LTE, Bluetooth and so on, and access either a cellular network access point 126, a satellite access point 127, or a fiber hybrid access point 128. This remote server 125 may then connect to a user device 115 (e.g., personal computer, smartphone, tablet, smart watch) via a different communication link (145), and the real-time wave conditions may be accessed using a mobile application 135 or web program.

In an example, the RIPS system shown in FIG. 1 is an easy to deploy tool for accurately measuring bottom orbital velocities, thereby enabling the correlation of wave energy exposure to sediment and sand build-up, and providing the harbor master a cost effective real-time data characterization of the kinetic energy carrying sand and sediment causing shoaling to occur. In another example, the RIPS system creates real-time local immersive data visualizations, condition reports, and text notifications based on data sensed using sub microclimate data acquisition buoys. This information along with the users input preferences for optimal surfing conditions eliminates surfers waiting for optimal surfing conditions to enjoy the ocean. The data provides surfers with a greater range of insight into local sub-microclimates impacting surfing conditions effectively eliminating the need to use only inefficient time lapsed meteorology forecasts based on data collected offshore via offshore weather buoys and satellites in orbit.

Example Embodiment of a RIPS Buoy

Figure 2A:
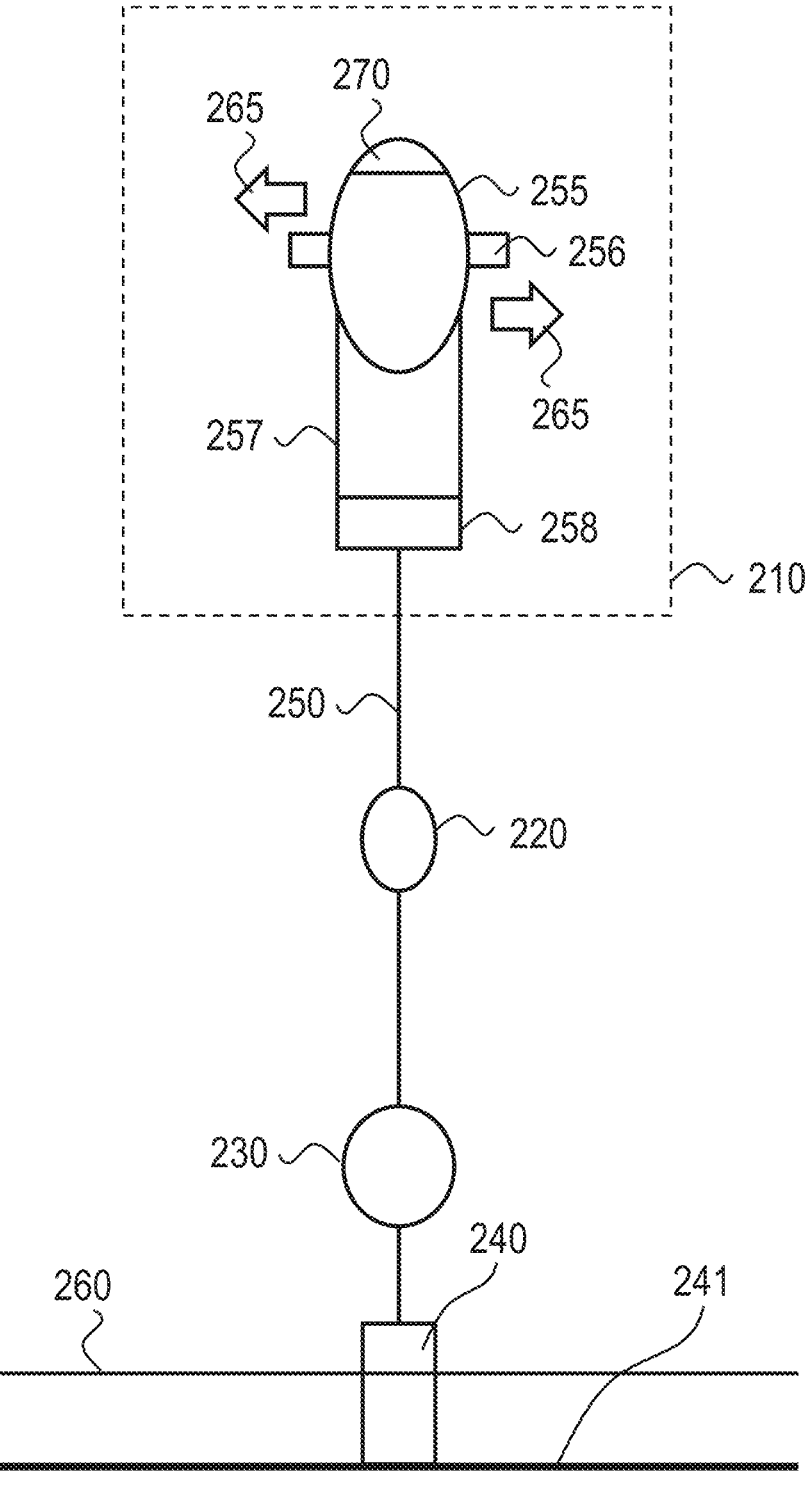
FIGS. 2A and 2B show block diagrams of an example buoy deployments for real-time wave monitoring and sensing, according to embodiments of the disclosed technology.

FIG. 2A shows a block diagram of an example of a deployed RIPS buoy that may be used for real-time wave monitoring and sensing, according to embodiments of the disclosed technology. As shown in FIG. 2A, buoy 210 includes an enclosure 255 that houses the sensing devices (or sensing/sensor array) 270 and communication radio 258. In some embodiments, the sensor array and the communication capabilities in the buoy may be different components. In other embodiments, they may be part of the same hardware and/or software implementation. The sensor array 270 may measure various characteristics of the wave conditions, and the side panels 256 may be used to sense the direction of the ocean current. Buoy 210 may further include a charging base (or cradle) 257 that is configured to charge the sensing and communications devices via a connector. In some embodiments, the buoy may be constructed to be able to twist (as indicated by arrows 265).

Buoy 210 is connected via an umbilical cord (or umbilical cable) 250 to additional components that are necessary for the deployment of the buoy. In some embodiments, the umbilical cord 250 is an armored cable that contains a group of electrical conductors and fiber optics that carry electric power, video, and data signals. In some embodiments, a tether may be wrapped around the umbilical cord to strengthen it (and some embodiments of the disclosed technology may use "tether" to describe a strengthen umbilical cord with the aforementioned functionality). For example, single- or multi-mode fibers may be entwined with 2- or 3-layer steel wire to provide the required functional capabilities and be robust to undersea conditions.

As shown in FIG. 2A, the buoy may be further connected to a recoil device 220, which extends and shortens with tidal changes, and is able to strengthen communication signals for transmission. The tether further connects the recoil device 220 to a power regeneration device 230, which provides power for the batteries by transforming ocean swell kinetics to electrical energy. The tether finally connects to an anchor 240. In one example, anchor 240 is a suction anchor that connects the deployment buoy to ocean floor 241 (below the mud line 260) with suction vacuum. In some embodiments, the suction anchor may include a weight at the base of the unit to further support the anchoring.

Figure 2B:
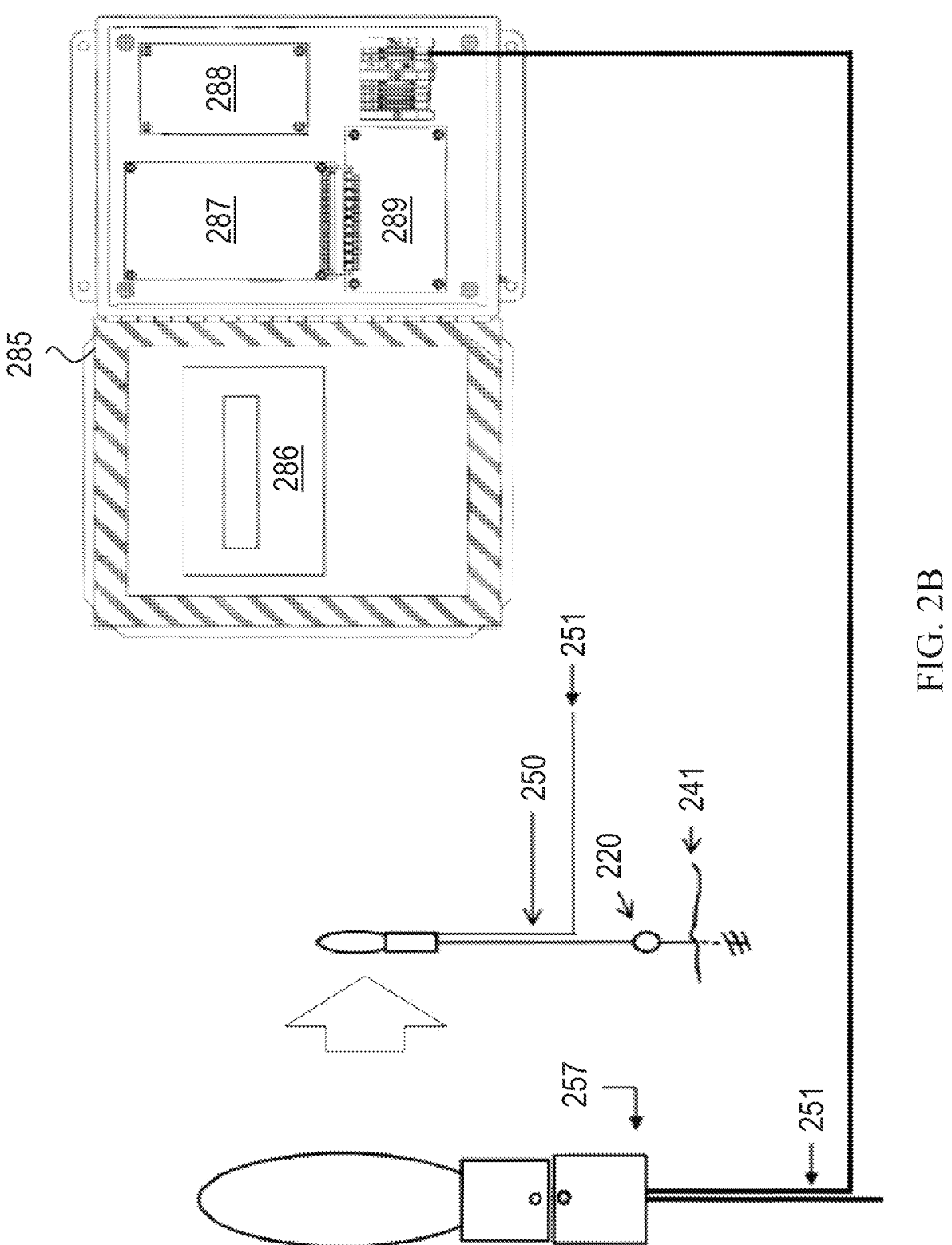

FIG. 2B shows additional elements of the deployment of a RIPS buoy. As such, it includes some components and features that are identical to those described in the context of FIG. 2A, and which are not explicitly discussed in the context of this figure. In some embodiments, and as shown in FIG. 2B, tether 250 may be co-located with a data cable 251 that connects the buoy to a surface data acquisition and data distribution system 285. In some embodiments, the surface data acquisition and data distribution system 285 may include a display 286, a communication board/device 287, a power supply 288 and a microcontroller 289, as separate components as shown in FIG. 2B. In other embodiments, the communication device 287 and the microcontroller 289 may be part of the same hardware and/or software component.

Figure 3:
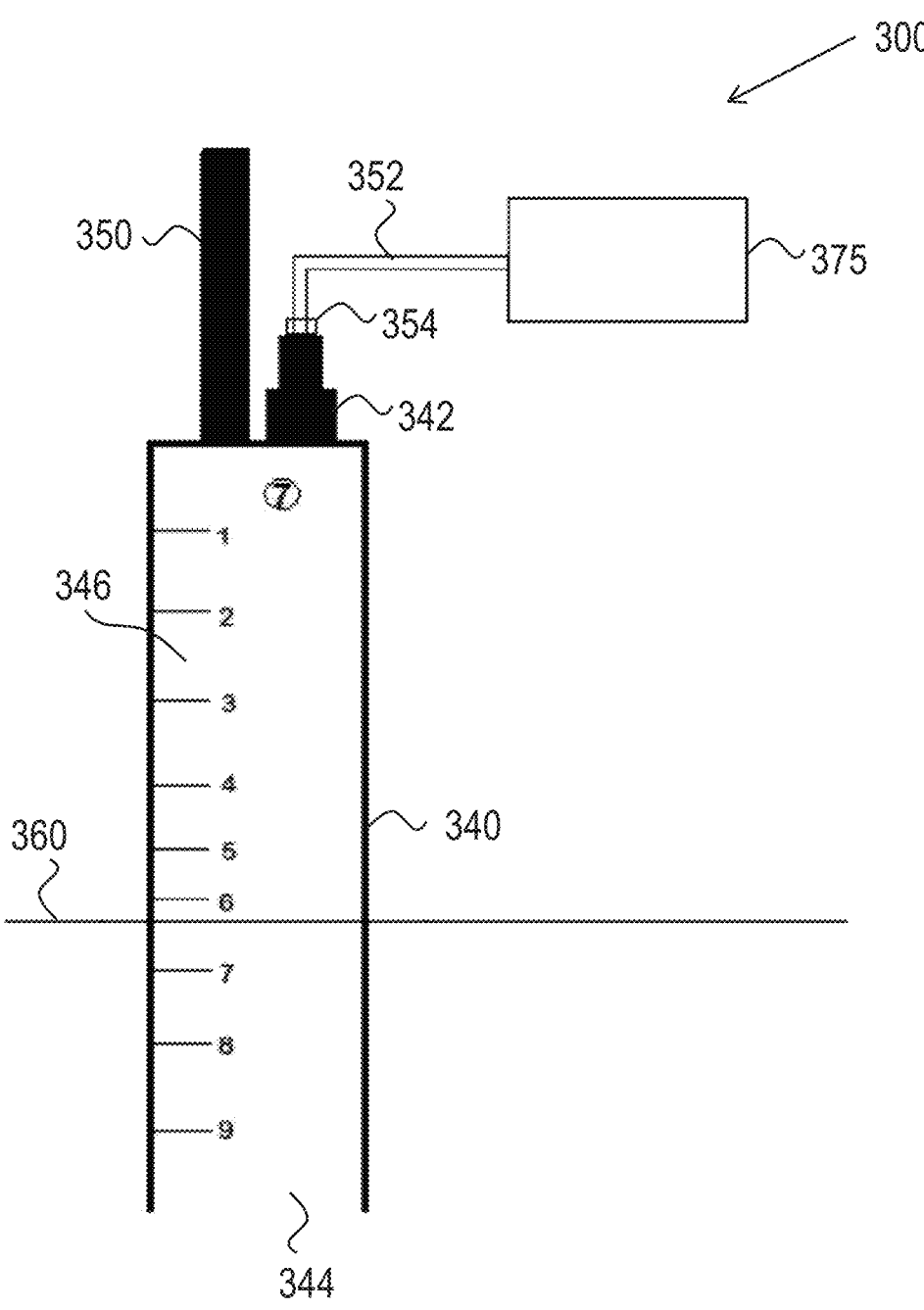
FIG. 3 shows a block diagram of an example anchor of a buoy.

FIG. 3 shows a block diagram of an anchor (e.g., corresponding to anchor 240 shown in FIG. 2) of a buoy. As shown in FIG. 3, the deployed suction anchor 300 (also referred to as a suction pile or suction caisson) includes a metal cylinder 340 that is placed into the sand/mud line 360. In some embodiments, the metal cylinder may be a 12-foot-long steel cylinder that includes a measurement ruler 346 for calibration during deployment and servicing. The operation of the suction anchor is based, in part, on creating (and dissipating) a vacuum in the water/sand displacement column 344.

The metal cylinder 340 is connected to the tether (or umbilical cord) 350 and is therefore able to secure the deployed RIPS buoy to the sea floor. The top of the metal cylinder 340 includes a two-way hydraulic check valve 342, which is connected to a high-pressure hose 352 using, for example, a ROV (remotely operated vehicle) quick connection 354.

In some embodiments, the high-pressure hose 352 connects the suction anchor to a hydraulic pump 375 on the surface, which is used to adjust the vacuum pressure in the suction anchor to securely anchor the RIPS buoy to the sea floor. For example, pumping fluid into the anchor raises it up, whereas pumping fluid out of the anchor creates a vacuum in the water/sand displacement column 344, causing the anchor to sink.

Figure 4:
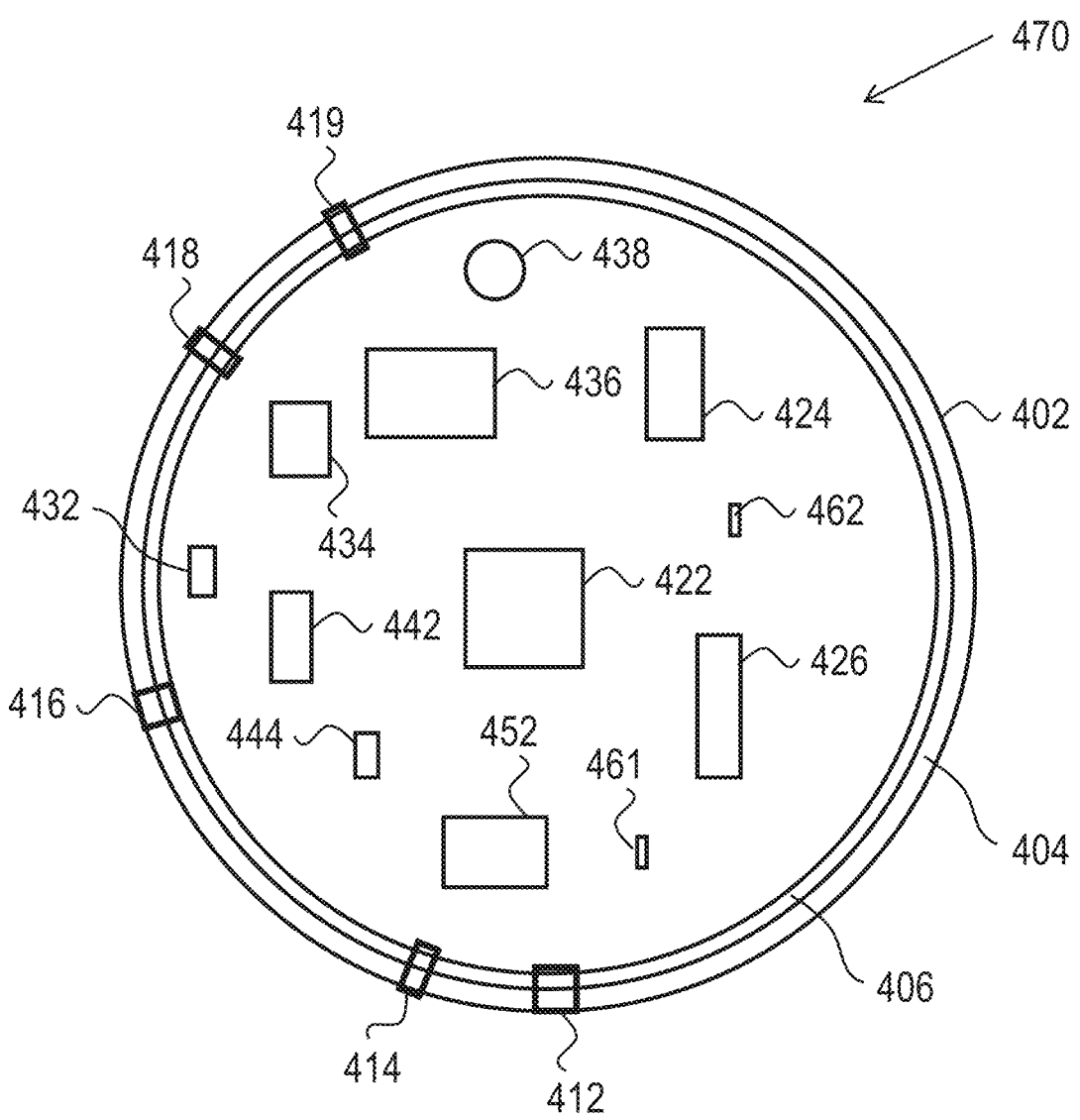
FIG. 4 shows a block diagram of an example sensing array of a buoy.

FIG. 4 shows a block diagram of a sensing array (e.g., corresponding to sensor array 270 in FIG. 2) of a buoy. In some embodiments, the sensing array 470 may include an outer shell 402, which encloses internal insulation 404 and an innermost layer of foam insulation 406. For example, the outer shell 402 may be a wooden shell that is made to insulate internal devices from sea water. For example, the foam insulation 406 may be made from biodegradable formulas such as shrimp shells, corn, etc. to provide insulation and buoyancy.

In some embodiments, the insulated shell may include a number of access ports, e.g., a port 412 for charging the device using a cradle, an antenna port 414 that allows communication of the buoy to one or more access points (of the same or different types), a data port 416 that allows divers or technicians to program or extract data from the device, a pressure port 418 that allows the unit to be pressurized for buoyancy, and a temperature port 419 that is a chamber the unit uses to measure differences of temperature points of the unit.

In some embodiments, the functionality of the sensing array 470 may be controlled by a microprocessor (or microcontroller) 422 and may include a data storage and/or memory 424 to serve as on-board storage of data collected by microprocessor 422, and a battery 426 to power the unit. The sensing array 470 may support different modalities, e.g. a pressure transducer 432 that converts ocean pressures into electrical currents for subsea pressure measurement, a vibration sensor 434 that measures the G-forces of the ocean current, a waterproof accelerometer 436, a camera 438 that may be used to determine the water clarity for scuba divers, a temperature probe 442 that measures the temperature of the ocean, and a Global Positioning System (GPS) unit 444 that allows for location tracking of the instrument. In some embodiments, the camera may be configured to operate as a microscopic particle counter (e.g., to count sand particles in parts per million) to enable, in conjunction with wave kinetic measurements, the monitoring of sediment and shoaling and/or shoreline changes in real-time.

In some embodiments, the sensor array 470 may further include a network card 452 that may be configured to communicate data to one or more network access points at the surface, or to transmit the data to a diver or a drone (depending on the specific implementation). The unit may further include silica packets (461, 462) to absorb moisture inside the unit from temperature changes that may occur.

Figure 5:
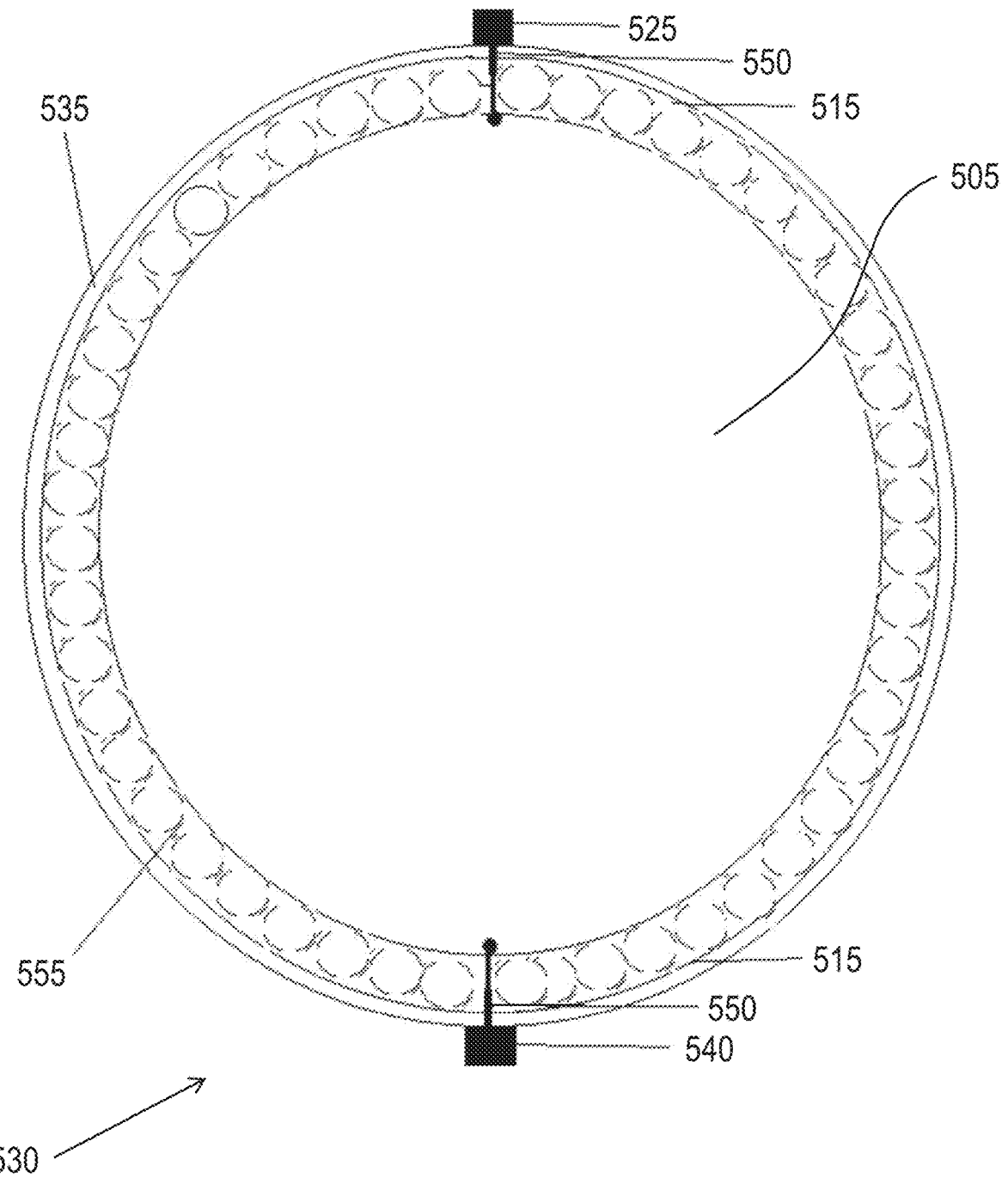
FIG. 5 shows a block diagram of an example power regeneration module of a buoy.

FIG. 5 shows a block diagram of a power regeneration device (e.g., corresponding to power regeneration module 230 in FIG. 2) of a buoy, which converts wave velocity kinetic energy into electricity for onboard power of sensors, communications, and battery charging.

As shown in FIG. 5, the power regeneration device 530 is secured by the tether 550 to the anchor 540, and includes a magnetic (e.g., iron) rotating/spinning core 505 encased in copper coils 555, which is surrounded by an electrical conductor 515 and an outermost layer of non-conductive insulation 535. Electricity is generated from wave kinetics by the buoy top rotation connected internally to the iron core 505 rotating inside the array of copper coils 555. In some embodiments, excess electricity that is generated may be distributed to the land-based power grid or remote electric car charging terminals located near the beach via electrical cable connection.

Figure 6:
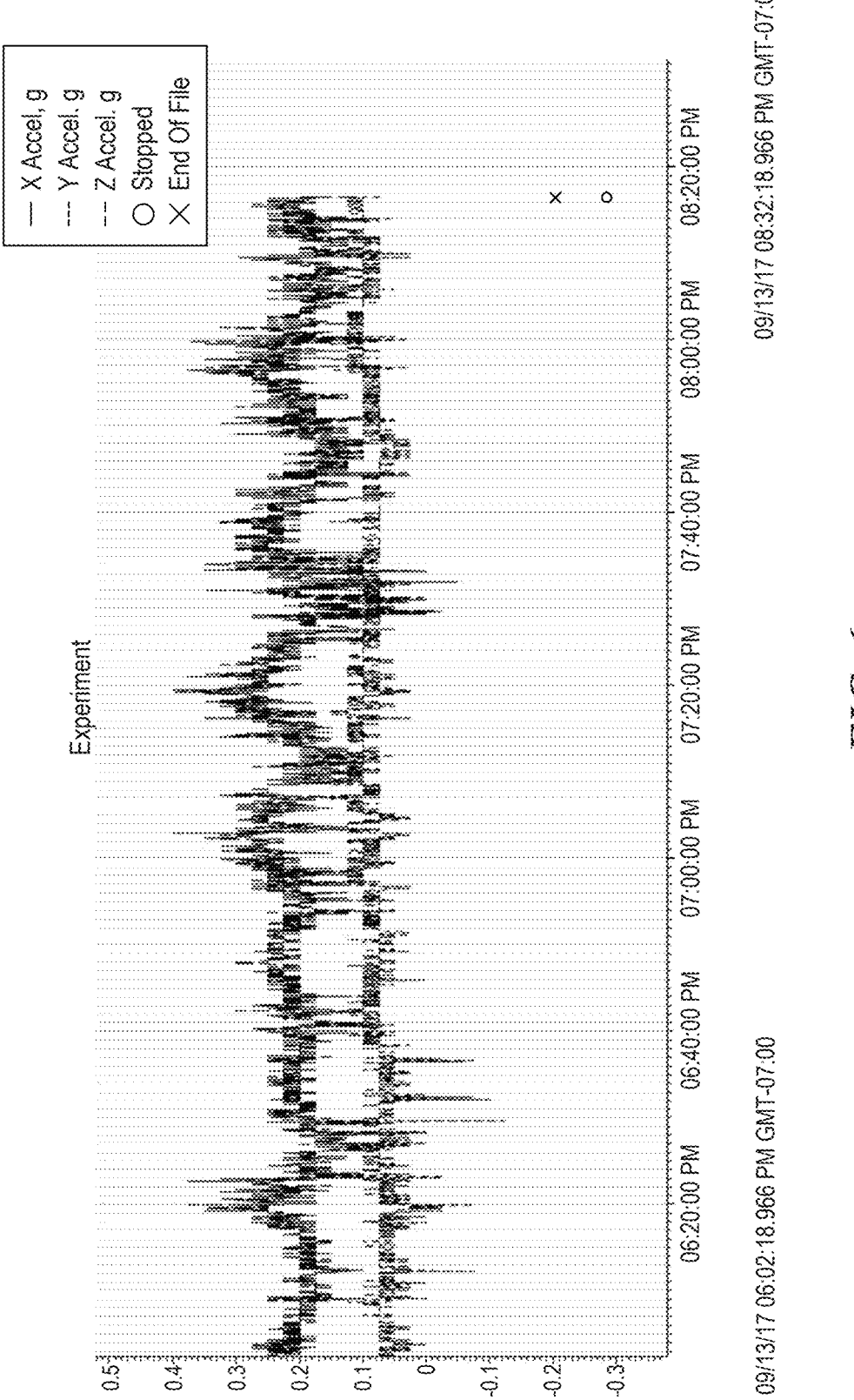
FIG. 6 shows an example of experimentally obtained wave data.

FIG. 6 shows an example of experimental wave data. In some embodiments, and as shown in FIG. 6, the data may be timestamped accelerometry data in the x-, y- and z-axis directions as function of time. Herein, the raw data from the waterproof accelerometer may be transmitted to the remote server, and then directly provided to the user. In other embodiments, the data may be processed on-board and then averaged (or aggregated or processed) data from the accelerometer may be provided to the user. In yet other embodiments, the data from one or more of the sensors may be combined using machine learning or computational algorithms, and aggregated data or results sent to the remote server. Embodiments of the disclosed technology may employ any of the aforementioned techniques, based on how much power is available on-board the buoy, and trading off computational and communication costs.

Example Embodiments of RIPS System Deployments

Embodiments of the disclosed technology may be used to address problems in many disciplines from physical oceanography to freshwater and marine ecology, as well as supporting safety systems (e.g., rip current and tsunami warnings), and sporting and leisure water activities. In some embodiments, the tether length and buoyancy of RIPS buoys may be adjusted to accommodate different wave environments. They may also be used to measure unidirectional water flow and also, with development of a non-rotating tether, can measure flow direction. The RIPS system can easily integrate into NOAA's data network enabling a forecaster to compare offshore buoy data with near-shore data providing a high level of accuracy.

In some embodiments, the RIPS system offers a new and innovative wave monitoring technology. Customers are provided nearly instantaneous access to live sub-microclimate wave information, notifications, and visualization data. This information can be used to improve surfer efficiency, improve safety and lessen nonproductive time. Sensor data can be used to determine the optimal time to travel to an area by increasing accuracy of wave information, traffic, weather conditions, equipment needed such as surfboard, wetsuit, fins, leashes, boots. Safety increases by recommending skill level and lessening sun exposure.

In some embodiments, and as described in the context of FIGS. 1, 2A and 2B, RIPS utilizes hybrid wireless communications to securely transmit data from equipment collecting data in the water to servers performing data aggregation and analysis. Mobile devices are fully supported, allowing a greater range of insight into minute-to-minute surf conditions. For example, remote sensing communication capabilities are realized by fiber to hybrid system infrastructure being installed locally making dead zones less of a burden when performing data acquisition wirelessly. The real-time reporting and notification system saves time and allows surfers to accurately schedule surf sessions without traveling to the beach or interpreting inaccurate reports of water conditions. For example, RIPS derives its value from saving surfers time and money. It provides surfers access to the technology necessary to consistently maintain safety, competitive advantage, and enjoyable surf experiences. Meteorologists typically produce inaccurate reports based on time-lapsed offshore buoy data not suitable for surfing sub-microclimates of the bay area and other similar topography. Embodiments of the disclosed technology advantageously overcome inaccurate reporting problems with the accurate sub-microclimate data enabling an exhilarating surfer experience. With visualizations in hand, consistent precision in catching an awesome wave may be achieved.

Figure 7A:
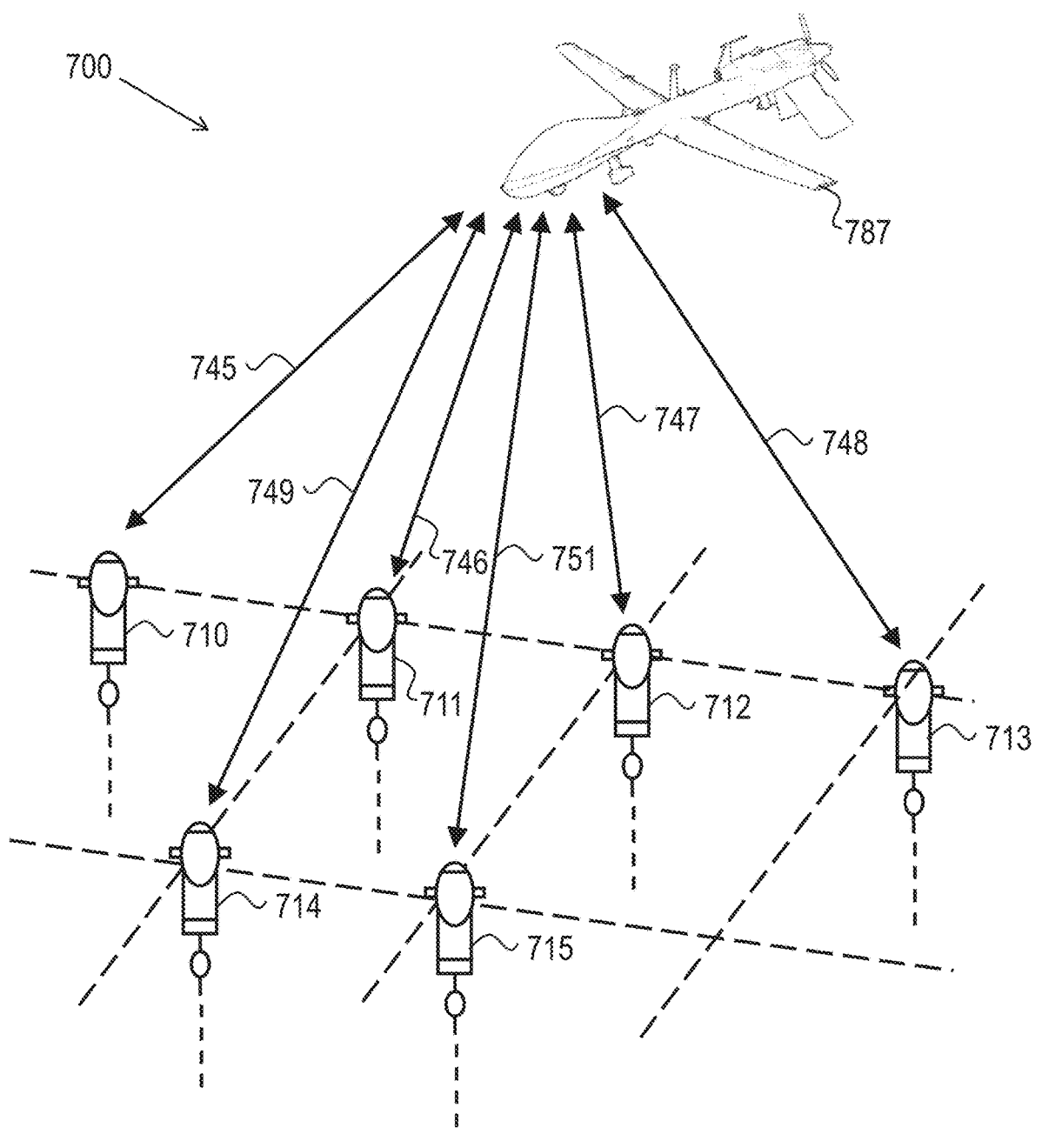
FIGS. 7A and 7B show examples of the deployment of multiple buoys for real-time wave monitoring and sensing, according to embodiments of the disclosed technology.
Figure 7B:
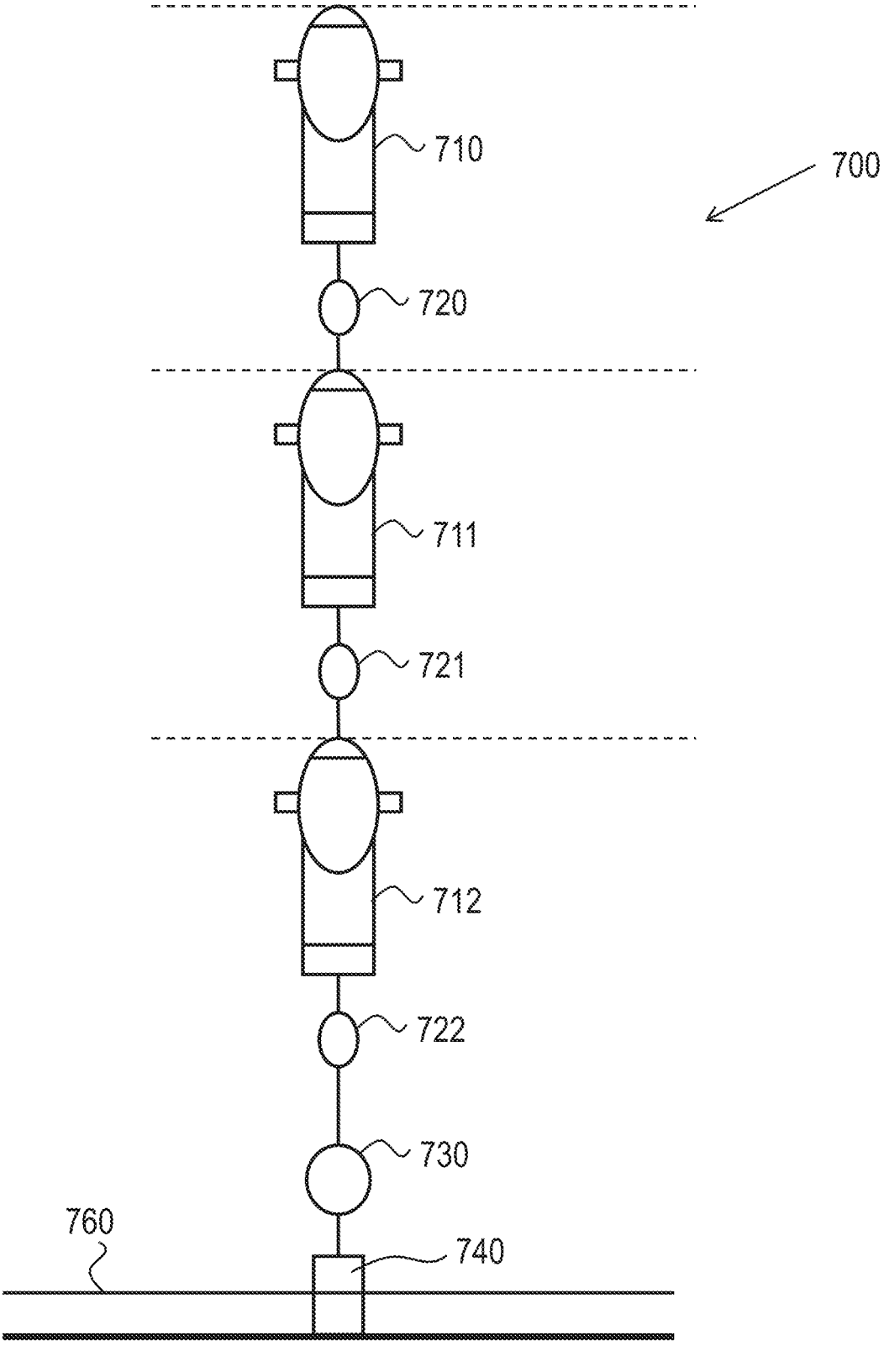

FIGS. 7A and 7B show examples of the deployment of multiple buoys for real-time wave monitoring and sensing, according to embodiments of the disclosed technology. As shown in the example in FIG. 7A, multiple RIPS buoys (710, 711, . . . , 715) may be deployed in the form of a grid (e.g., a 100-yard square grid), and can be used to track the spatial and temporal variation of the waves and currents. In some embodiments, the information from the RIPS buoys (710, 711, . . . , 715) may be wirelessly collected by a drone 787 via communication links (745, 746, . . . , 751), respectively. In an example, the information from a grid of RIPS buoys may be integrated with NOAA data to provide a more accurate estimate of wave conditions. Using a grid of RIPS buoys may also provide detailed microclimate and sub-microclimate maps for any region in which they are deployed.

In another example, and as shown in FIG. 7B, multiple RIPS buoys (710, 711, 712) may be deployed in a vertical manner so as to track waves and currents at different depths. In some embodiments, each of the buoys (710, 711, 712) may be deployed with their corresponding recoil devices (720, 721, 722), respectively, connected to a single power regeneration device 730, and secured to the ocean floor (below the mud line 760) using a suction anchor 740.

In some embodiments, the frameworks shown in FIGS. 7A and 7B may be combined to provide accurate wave and current information through the entire water column and over a wide area. In an example, a series of RIPS buoys placed in the harbor may collect information about sand build-up. This information may then transmitted in real-time to the surface and aggregated into software that produces a dynamic visualization of sand sediment build up for the harbor master. The dynamic visualization may then be used by the harbor master to plan and execute dredging operations safely.

In another example, the deployment of one or more RIPS buoys may be used as part of a dynamic positioning (DP) system, which assists in the stabilization of an offshore supply vessel when loading and unloading cargo without anchoring in deep water. The system takes time to stabilize the boat while the DP system performs wave force calculations using wind, roll, and pitch data to determine how to counter act these forces using its engine thrustors. The wave sensor data integrates into the dynamic positioning computer when performing calculations. This real-time data from the RIPS buoys decreases stabilization time and increases control of the vessel in rough seas lessening the down-time of a rig.

In yet another example, the deployment of one or more RIPS buoys may be used to provide knowledge of sub-microclimates for surfing (or watersport activities in general), since conditions in the water can change dramatically in short periods of time. Embodiments of the disclosed technology that provide the rapid detection of changing conditions enable a safe and more enjoyable way of learning to surf.

Figure 8:
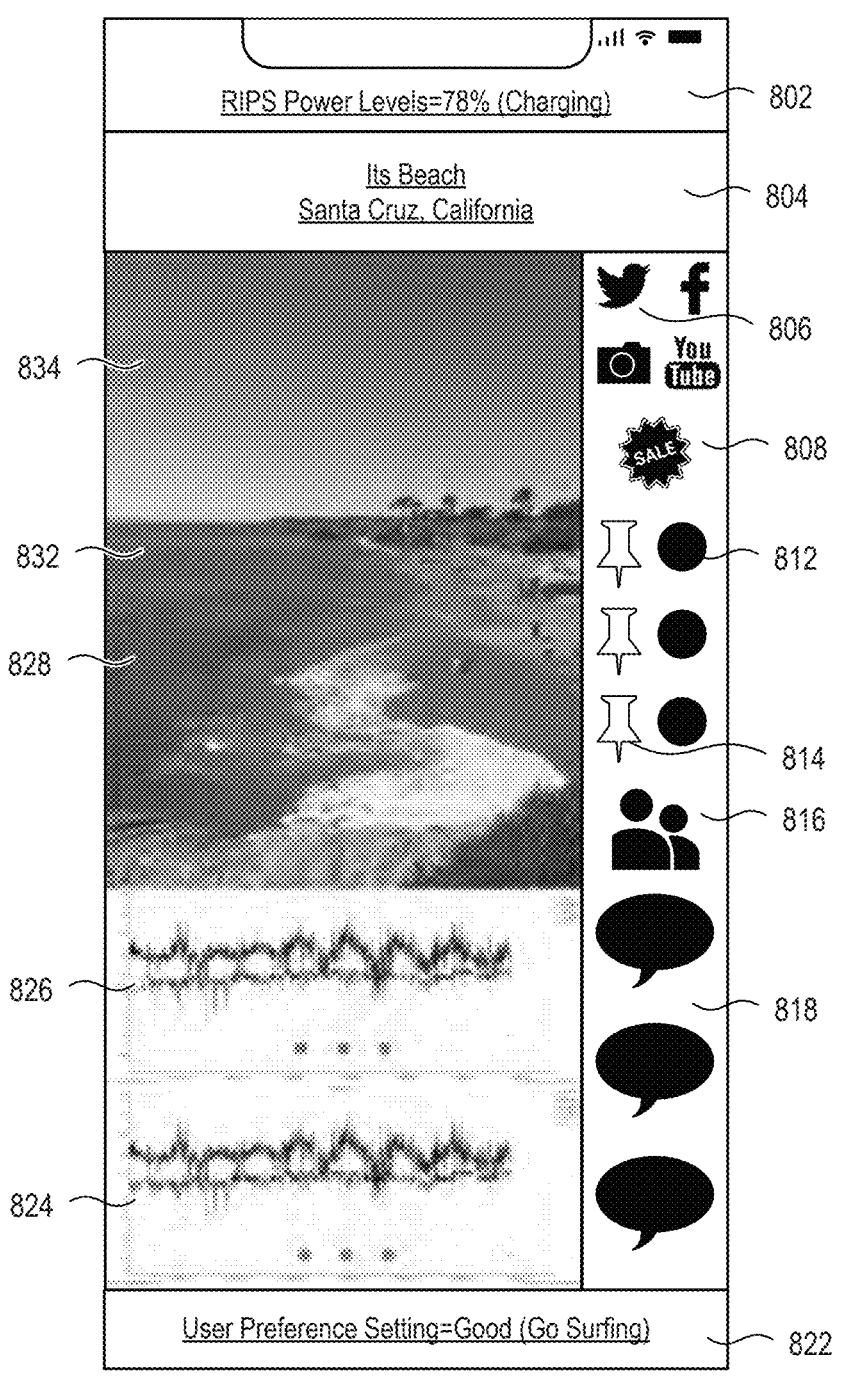
FIG. 8 shows an example screenshot of a mobile application interface that may be used to interact with embodiments of the disclosed technology.

FIG. 8 shows an example screenshot of a mobile application interface that may be used to interact with embodiments of the disclosed technology when searching for the perfect surfing experience. As shown in FIG. 8, the mobile application interface comprises features and elements that assist in a safer and more enjoyable surfing experience, and may also provide diagnostic information regarding the deployed RIPS system (e.g. the power level of one or more RIPS buoys may be displayed (802)).

In the example shown in FIG. 8, the interface may display the location of the sub-microclimate currently being displayed (804), and further provide the option to switch to other microclimate statuses (812). The application may be integrated with social media feeds (806), highlight relevant products for rent or sale (808, e.g., Craigslist), enable sharing data with friends and contacts (816, 818), and display local locations that support a great surfing experience (814).

In some embodiments, the mobile application may provide the user with augmented reality (AR) weather visualizations (834), AR wave realizations (832), real-time wave data based on a location (826) either suggested by the application or selected by the user, predicted wave data analysis and characterization (824), and rip current and/or tsunami warnings (828).

In other words, embodiments of the disclosed technology enable:

(1) Surveillance, by monitoring the sub-microclimate conditions to detect developing optimal surfing opportunities;

(2) Diagnosis, based on the simplification of sub-microclimate weather reporting for determining a surf plan based on surfer location, skill level, equipment tolerance, and wave pattern characterization data with the assistance of machine learning technology; and (3) Recommendations, by performing go-to action notifications based on pre-set user specifications and predictive machine learning recommendations giving the surfer a heads-up of the buildup of a great surf session.

Flow Diagrams and Methods for Example Embodiments

FIGS. 9-11, 12A and 12B show flow diagrams for different aspects of real-time wave monitoring and sensing, according to embodiments of the disclosed technology. As shown in the flow diagrams, machine learning and computational algorithms are used to produce outputs based on inputs for different aspects of real-time wave monitoring and sensing. Details regarding the machine learning framework, including the underlying statistical and classification models, may be found in U.S. Pat. Nos. 6,532,305 B1, 5,586,218 A, 6,098,059 A and 5,946,674 A. The entire content of each of the aforementioned patents is incorporated by reference as part of the disclosure of this patent document.

Figure 9:
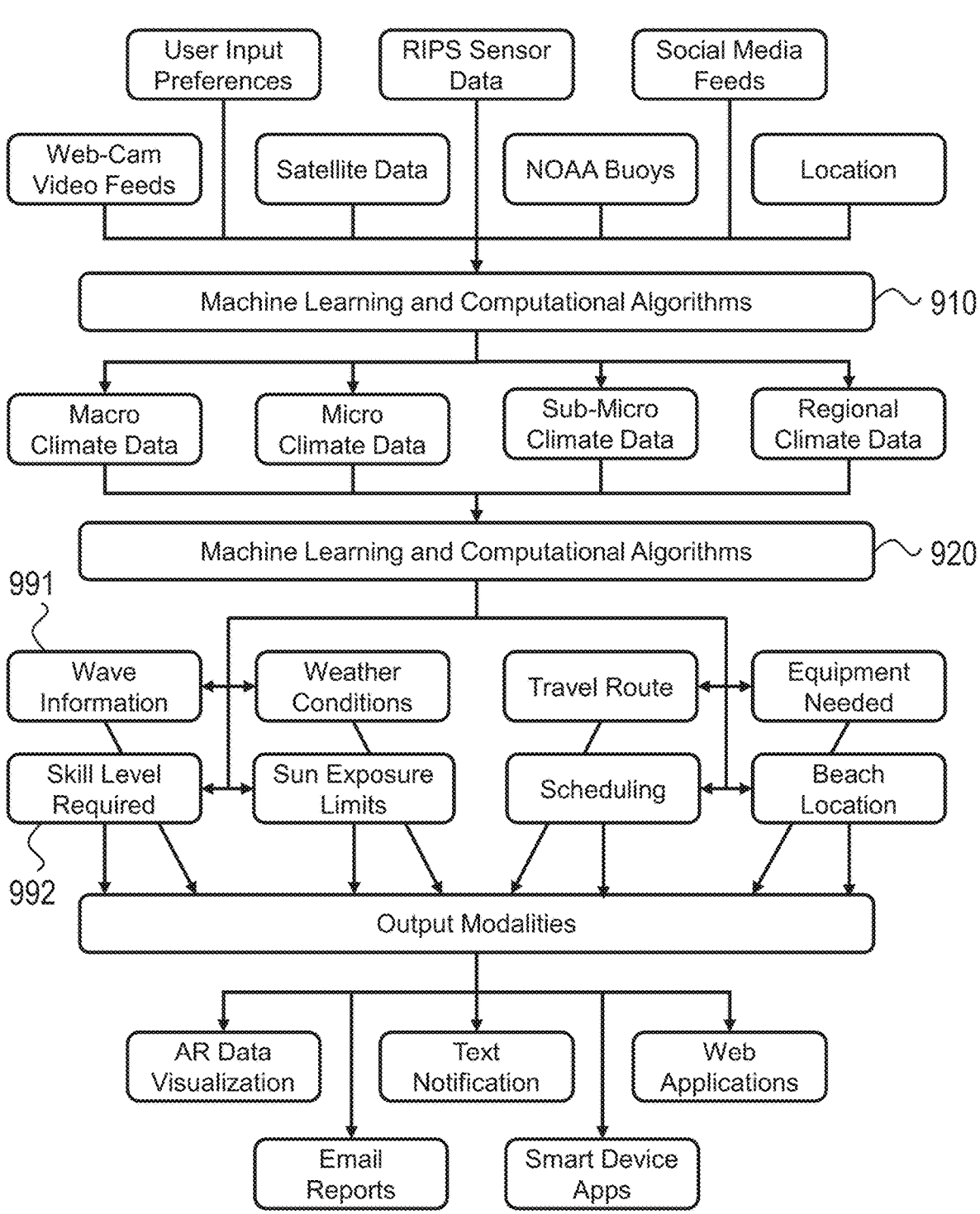
FIG. 9 shows a flow diagram for real-time wave monitoring and sensing, according to embodiments of the disclosed technology.

FIG. 9 shows an example flow diagram of the machine learning analysis for the RIPS system. As shown therein, the initial set of inputs include one or more of user input preferences, RIPS sensor data (which is measured collected via the RIPS buoys are transmitted to the remote server, as shown in the context of FIG. 1), social media feeds, webcamera video feeds, satellite data, information from NOAA buoys, and a user and/or beach location. In other words, the machine learning and computational algorithms 910 are able to combine a number of secondary sources of data with the RIPS sensor data to output climate data. In some embodiments, the output climate data may include one or more of macroclimate data, microclimate data (e.g., a local set of atmospheric conditions that differ from those in the surrounding areas, often with a slight difference but sometimes with a substantial one), sub-microclimate data, and regional climate data. In other words, because climate is statistical, which implies spatial and temporal variation of the mean values of the describing parameters, within a region there can occur and persist over time sets of statistically distinct conditions. Thus, machine learning algorithms are able to combine the RIPS sensor data with secondary sources to generate climate conditions across differently sized spatial regions.

In a second step, the various climate data may be input into the machine learning and computational algorithms 920 to generate one or more outputs that a user may use to plan and execute an enjoyable and rewarding surfing experience. The various outputs that are available to the user include wave information, weather conditions, a user skill level, sun exposure limits, a travel route from the user's current location to the recommended surfing spot, equipment needed, scheduling information (e.g., when is the surfing spot open till, does the user have prior commitments, etc.) and beach locations.

In some embodiments, one or more of the various outputs may be delivered to the user using at least one of the enumerated output modalities. For example, the outputs may be provided to the user using an AR data visualization or an application for a smartphone (as described in the context of FIG. 8), or via text or email notification and updates, or through a web application, and depending on the preference of the user.

In some embodiments, and in the context of FIG. 9, some features of the disclosed technology include:

(1) Accuracy: delivering sub-microclimate reports for optimized local surfing;

(2) Predictive diagnosis: wave characterization used in developing a plan based on events predicted within an hour window using machine learning analysis giving the surfer a heads up on a potentially great experience;

(3) Notifications: action notifications based on pre-set user specifications and machine learning recommendations give surfers traffic recommendations, estimated travel times, equipment needed, and length of expected surf conditions. This reduces excess down time stuck in traffic, wrong turns to surf beaches, and excess equipment weight saving in fuel consumption that contributes to negatively impacting the coastal environments; and (4) location: radius analysis notifies the surfer if response time is achievable based on current location and location of the beach being monitored by indicating a radius in which the surfer can travel in and would still be able to respond to waves if conditions present to be optimal for surfing at the beach being monitored by the RIPS system.

Figure 10:
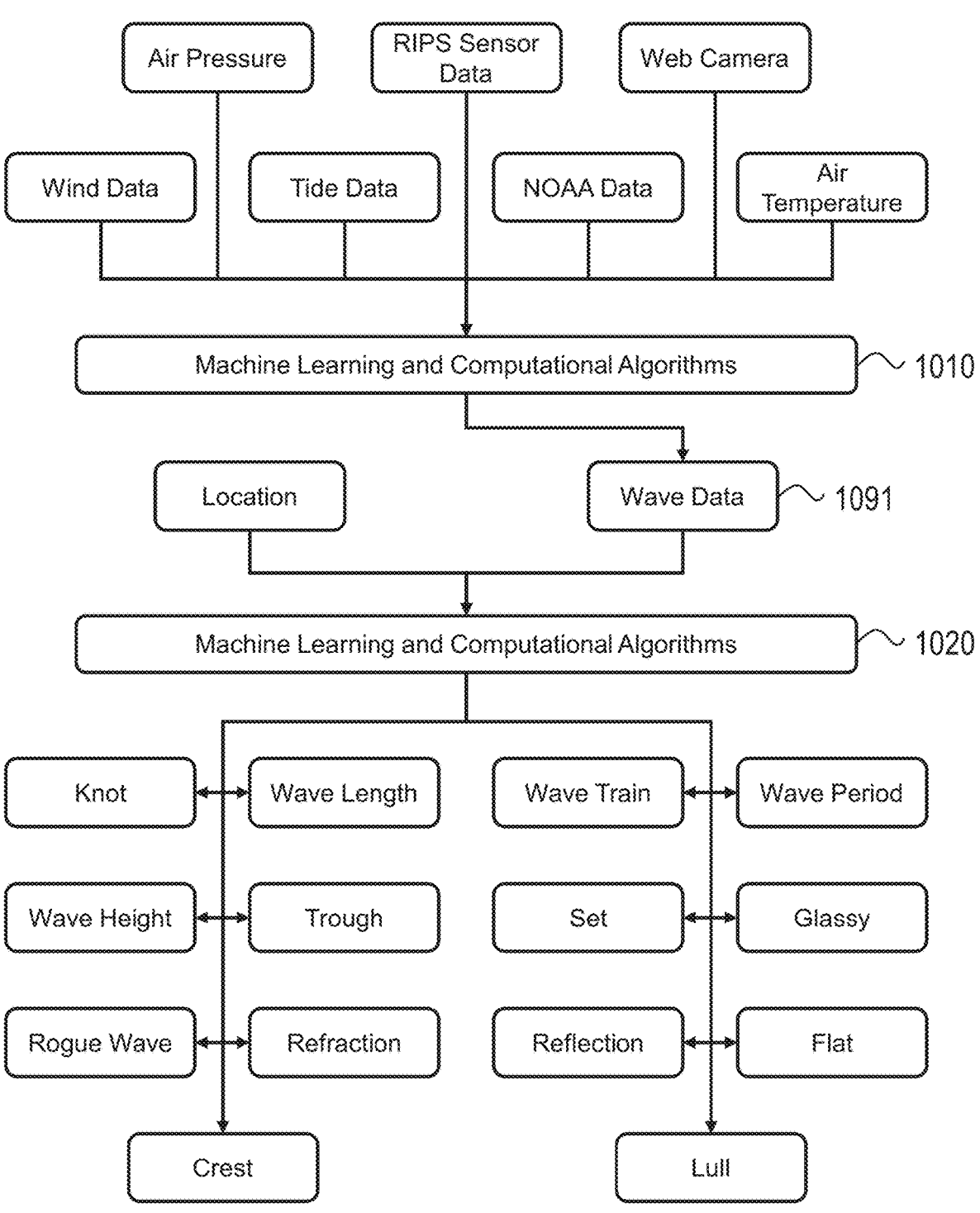
FIG. 10 shows a flow diagram for wave data monitoring.

FIG. 10 shows an example flow diagram for the machine learning and computational analysis that generates wave data. As shown therein, the inputs to a first set of machine learning and computational algorithms 1010 may include air pressure data, wind data, tide data, RIPS sensor data, webcamera feeds, NOAA data, and/or air temperature data. As discussed earlier, the disclosed technology may use a combination of secondary sources with the RIPS sensor data, and in this example, generate wave data (1091). In an example, the wave information (991) shown in FIG. 9 may correspond to the generated wave data (1091).

The wave data (1091) may be used in conjunction with location data (e.g., location of the one or more RIPS buoys, the user location, etc.) to determine several wave characteristics that are enumerated in the following table (and a subset of which are shown in FIG. 10).

TABLE 1

| Wave Characteristics | |
|---|---|
| Characteristic | Description |
| Knot | A unit of speed equal to one nautical mile per hour |
| Wave length | The distance between the crest of one wave to a crest of the next |
| Wave height | The difference between the elevations of a crest and a neighboring trough |
| Trough | The bottom of the wave, the opposite of a crest |
| Rogue wave | An open ocean wave bigger than the current sea condition |
| Refraction | The effect by which a swell moving along a point of land slows down where it feeds shallow water |
| Crest | The top and highest point of a wave |
| Wave train | A group of swells of similar wave lengths |
| Wave period | The time between two consecutive wave crests |
| Set | A group of waves |
| Glassy | A maritime condition when there is no wind to ripple the wave force |
| Reflection | When a wave strikes a hard object and bounces some of its energy off into another direction |
| Flat | With no waves or with no surf |
| Lull | Time between sets of waves with no waves breaking |
| Section | A part of the wave that breaks ahead of the curl line |
| Pit | The impact zone of the wave or the most hollow part of the tube |
| Peak | The spot in the ocean where the wave breaks for both sides |
| Lip | The curling part of a wave |
| Groundswells | A swell that traveled thousands of miles through the ocean with a period of 15 seconds or more |
| Corduroy | The vision of a series of swells marching in from the horizon |
| Closeout | When a wave breaks all at once, with no shape or shoulder |
| Chop | Bumpy ocean and wave conditions that are rough due to strong winds or currents |
| Carve | A sharp turn on the wave face |
| Beach break | Waves that break over sandbars |
| Bathymetry | The measurement of depths of water in oceans and seas |
| Barrel | The tube, or the curl of the wave |
| Wedge | A steep wave |
| Backwash | When a wave sweeps up the beach and returns to the ocean, sometimes colliding with incoming waves |

Figure 11:
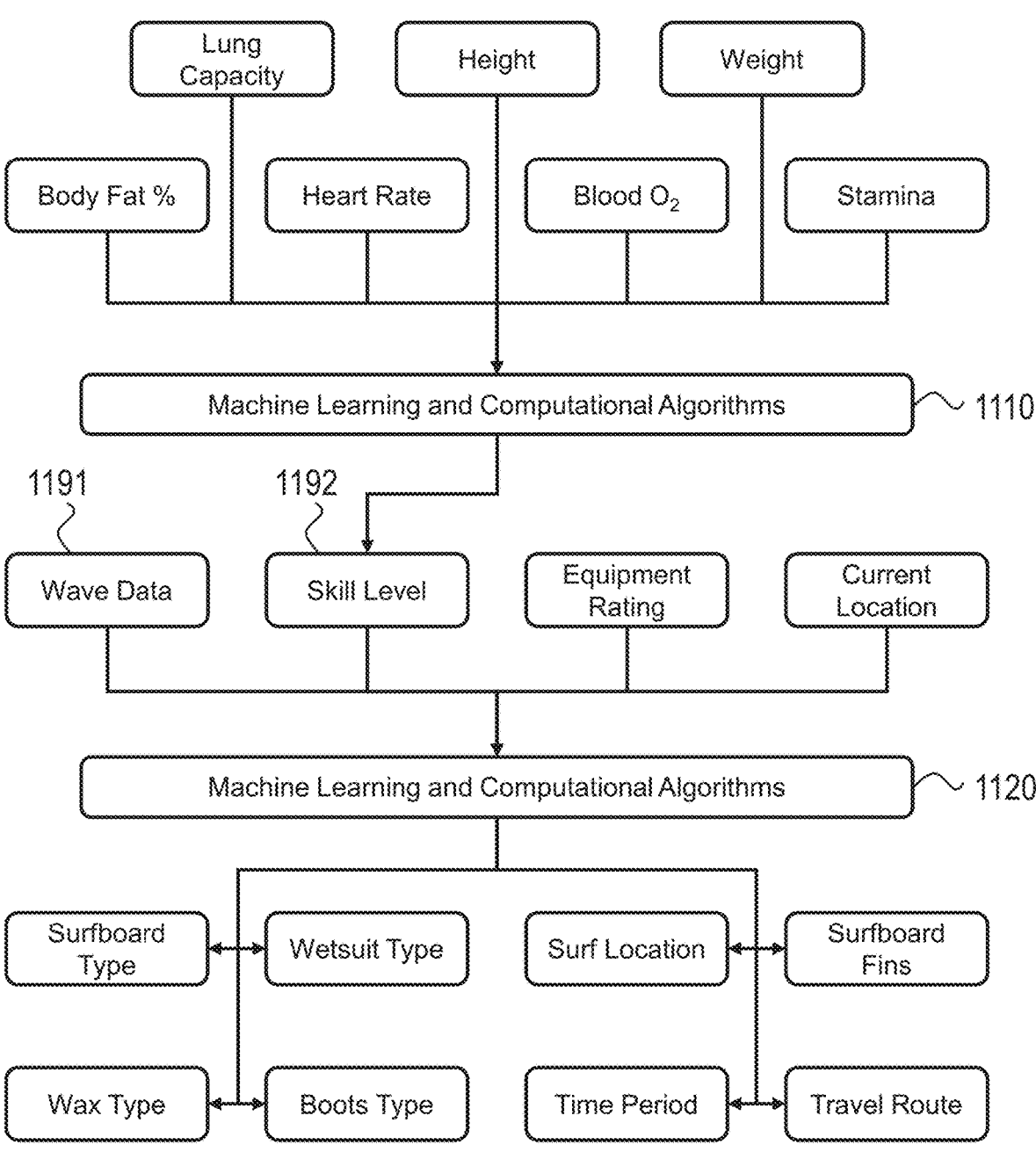
FIG. 11 shows a flow diagram for user skill and equipment determinations.

FIG. 11 shows an example flow diagram for the machine learning and computational analysis that generates user skill and equipment determinations. As shown therein, input to a first set of machine learning and computational algorithms 1110 may be a user's vital statistics, which include lung capacity (e.g., liters of air), height, weight, body fat %, heart rate (e.g., beats per minute), blood $O_2$ and stamina (e.g., average heart rate elevation over time). The vital statistics may be used to generate a user's surfing skill level (1192). In an example, the skill level required (992) shown in FIG. 9 may correspond to the generated skill level (1192).

The generated skill level (1192) may be used in conjunction with wave data (1191), equipment ratings and a user's current location as inputs to a second set of machine learning and computational algorithms 1120, which may subsequently generate information that may be used by the user to plan and execute an enjoyable surfing experience. In some embodiments, this generated information may include a surfboard type, a wetsuit type, a surfboard wax type, a boot type, a surfing location, a surfboard fin type, a time window (or period) for surfing, a leash type, and a travel route from the user's current location to the recommended surfing location.

Figure 12A:
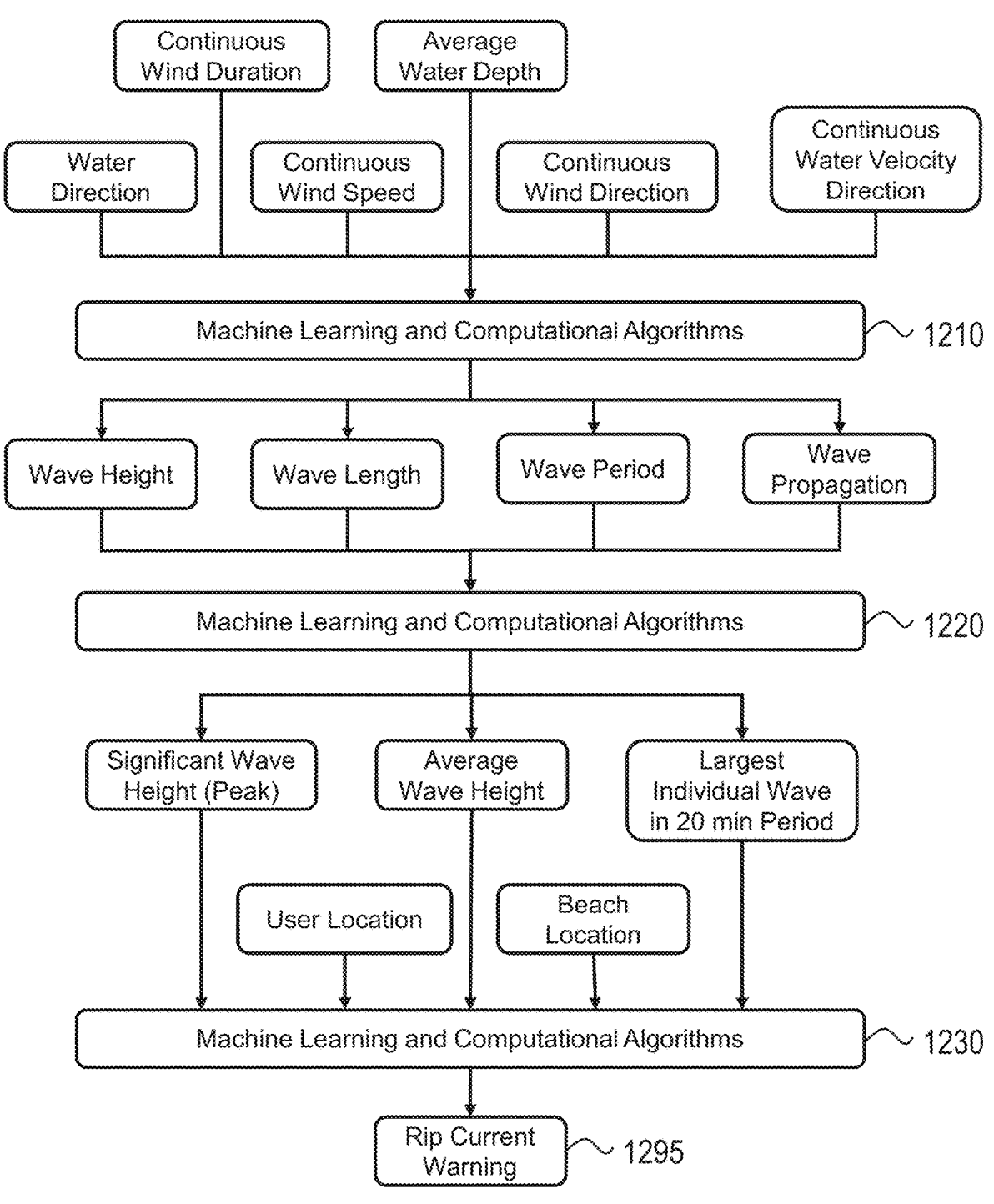
FIGS. 12A and 12B show flow diagrams for determination of rip current and tsunami warnings, according to embodiments of the disclosed technology.
Figure 12B:
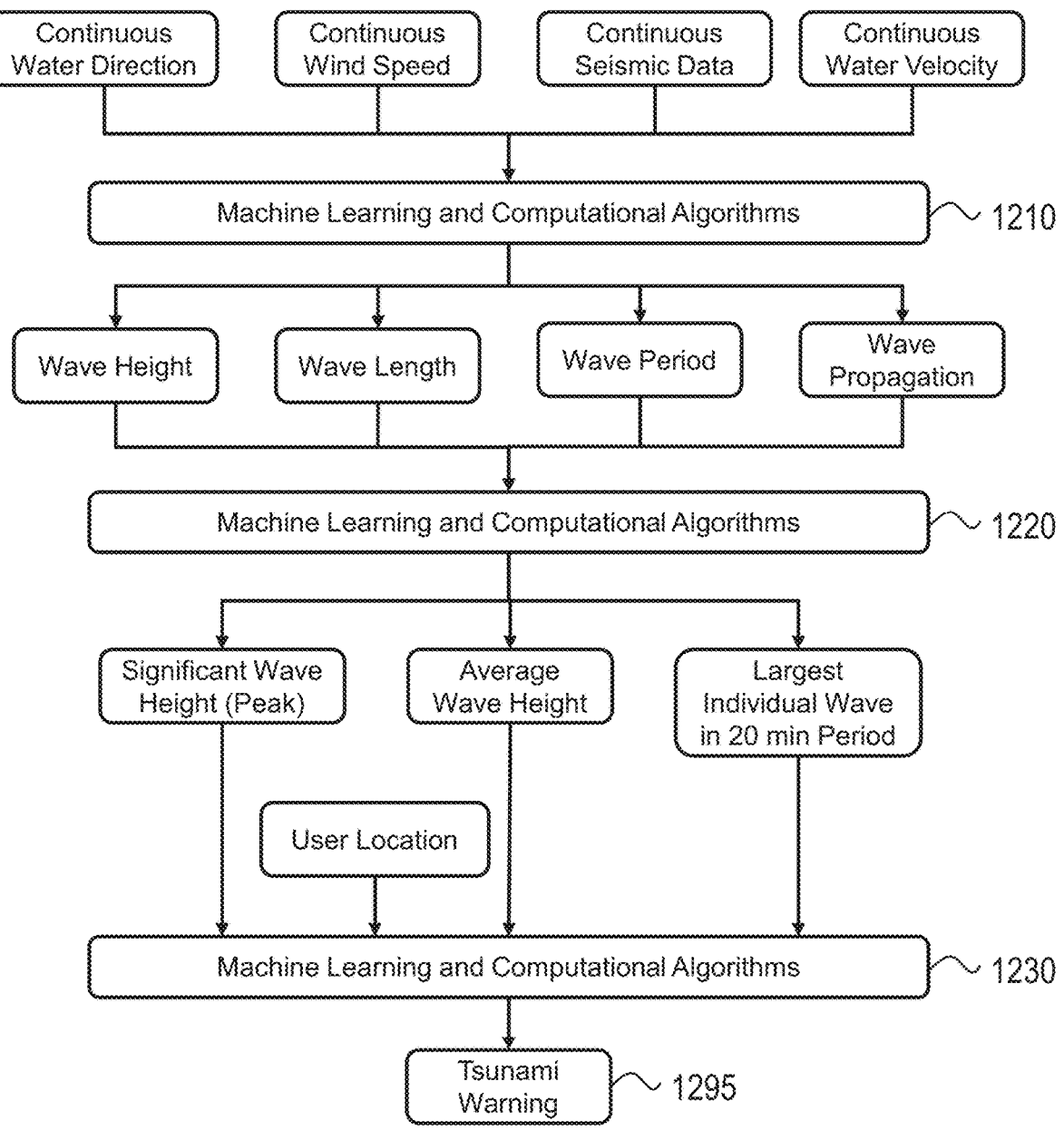

FIGS. 12A and 12B show example flow diagrams for the machine learning and computational analysis that generates rip current and tsunami warnings to alert users. As shown therein, a first set of inputs to the machine learning and computational algorithms 1210 may include water direction data, continuous wind duration data, continuous wind speed data, average water depth data, continuous wind direction data, and continuous water velocity direction data. These inputs, which may be ascertained based on the sensing arrays in one or more RIPS buoys, are used to generate wave characteristics that may include wave height, wave length, wave period, or wave propagation (or other characteristics tabulated above).

In some embodiments, the wave characteristics are used as inputs to a second set of machine learning and computational algorithms 1220 that generates aggregated wave characteristics that may include significant wave height (or peak), the average wave height and/or the largest individual wave in a fixed period (e.g., 20 minutes). These outputs are used in conjunction with a user location and a beach location as inputs to a third set of machine learning and computational algorithms 1230 that generates a rip current warning 1295.

Similarly, FIG. 12B shows the machine learning and computational analysis that generates tsunami warnings to alert users. In this scenario, the inputs to the first set of machine learning and computational algorithms 1210 may include continuous water direction data, continuous wind speed data, continuous seismic data, and continuous water velocity data. The second set of machine learning and computational algorithms 1220 is used in a manner similar to that described in the context of FIG. 12A, and the aggregated wave characteristics are used in conjunction with a user location as inputs to a third set of machine learning and computational algorithms 1230 that generates a tsunami warning 1295.

Figure 13:
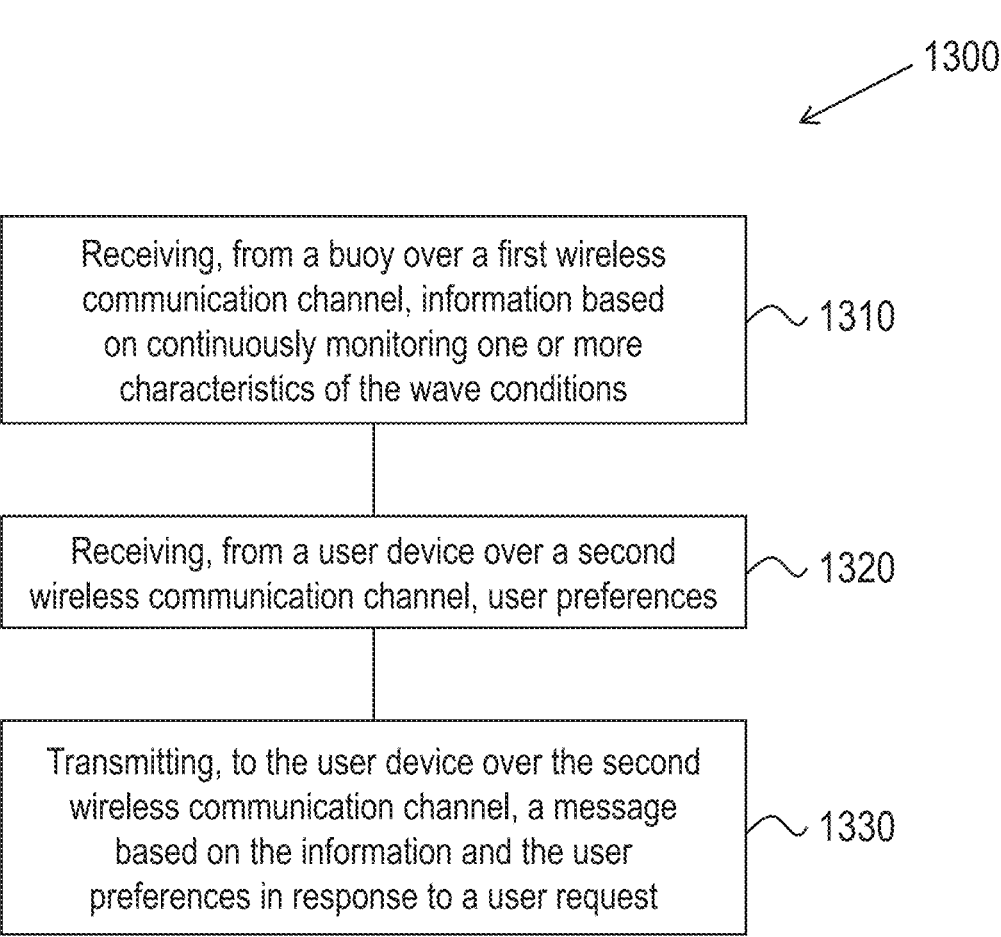
FIG. 13 shows a flowchart of an example method of real-time monitoring and sensing of wave conditions, according to embodiments of the disclosed technology.

FIG. 13 shows a flowchart of an example method 1300 of real-time monitoring and sensing of wave conditions, which may be implemented at a remote server (e.g., cloud computing services 125 in FIG. 1). The method 1300 includes, at step 1310, receiving, from a buoy over a first wireless communication channel, information based on continuously monitoring one or more characteristics of the wave conditions. In some embodiments, and as discussed in the "Example Embodiment of a RIPS Buoy" section, the buoy may include a sensor array that includes at least one of a camera, an accelerometer, a vibration sensor, a temperature sensor, or a pressure transducer.

The method 1300 includes, at step 1320, receiving, from a user device over a second wireless communication channel, user preferences. The method 1300 may further include the step of generating the message by combining the information and the user preferences based on a machine learning or computational algorithm, as discussed in the "Flow Diagrams and Methods for Example Embodiments" section. In some embodiments, the first and second communication channels may be part of the same infrastructure (e.g., the cellular LTE network). In other embodiments, the first channel may be a cellular LTE network communication link, whereas the second channel may be a Bluetooth or Wi-Fi link.

The method 1300 includes, at step 1330, transmitting, to the user device over the second wireless communication channel, a message based on the information and the user preferences in response to a user request.

Figure 14:
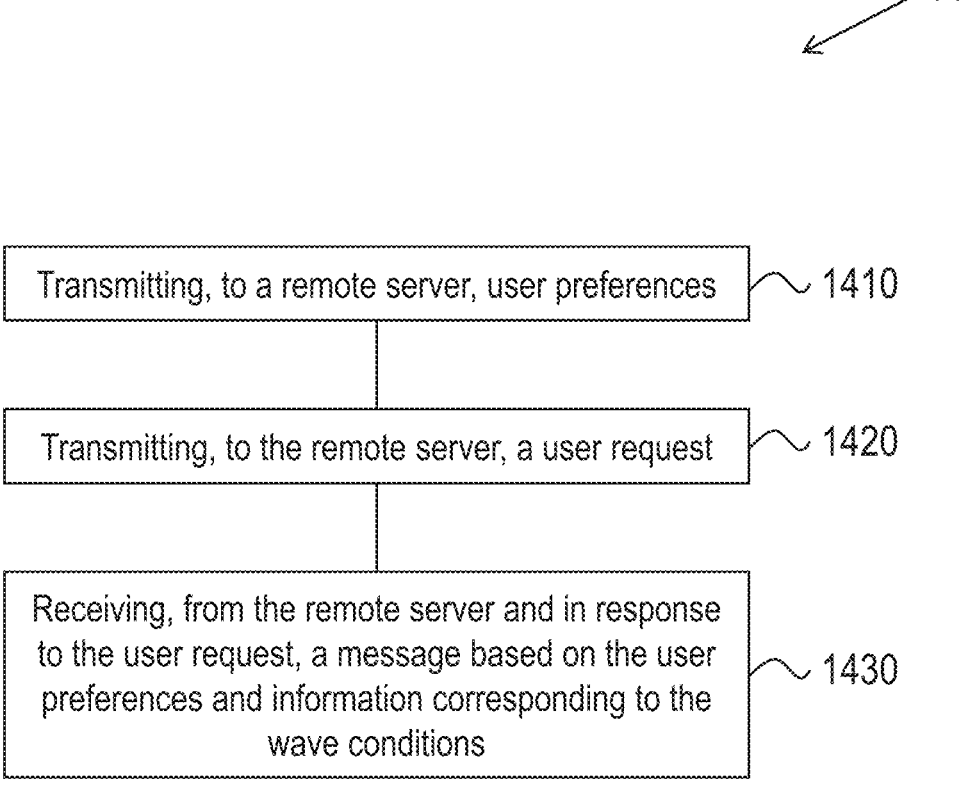
FIG. 14 shows a flowchart for another example method of real-time monitoring and sensing of wave conditions, according to embodiments of the disclosed technology.

FIG. 14 shows a flowchart for another example method 1400 of real-time monitoring and sensing of wave conditions, which may be implemented at a user device (e.g., smartphone or tablet 115 in FIG. 1). The method 1400 includes, at step 1410, transmitting, to a remote server, user preferences.

The method 1400 includes, at step 1420, transmitting, to the remote server, a user request. In some embodiments, the user preferences include a user surfing skill level, and transmitting the user request include accessing an application. For example, simply accessing the application may send a request to the remote server for an update on wave conditions associated with a pre-selected location by the user.

The method 1400 includes, at step 1430, receiving, from the remote server and in response to the user request, a message based on the user preferences and information corresponding to the wave conditions. In some embodiments, the message may include a determination of whether the wave conditions at the monitoring location are compatible with the user surfing skill level. For example, and as discussed in section "Flow Diagrams and Methods for Example Embodiments", one or more sets of machine learning and computational algorithms may be used to determine the user skill level based on the user's vital statistics, and subsequently used to determine which surfing location has wave conditions that are suited for the user, and will provide an enjoyable surfing experience.

In some embodiments, and as discussed in the context of FIG. 8, the application may include at least one of a social media feed, a local product for rent or sale, a graphical representation of a portion of the wave condition information (e.g., raw data from a sensor, or aggregated data that was processed on either the buoy or the remote server), or traffic data between a current user location and the monitoring location.

Figure 15:
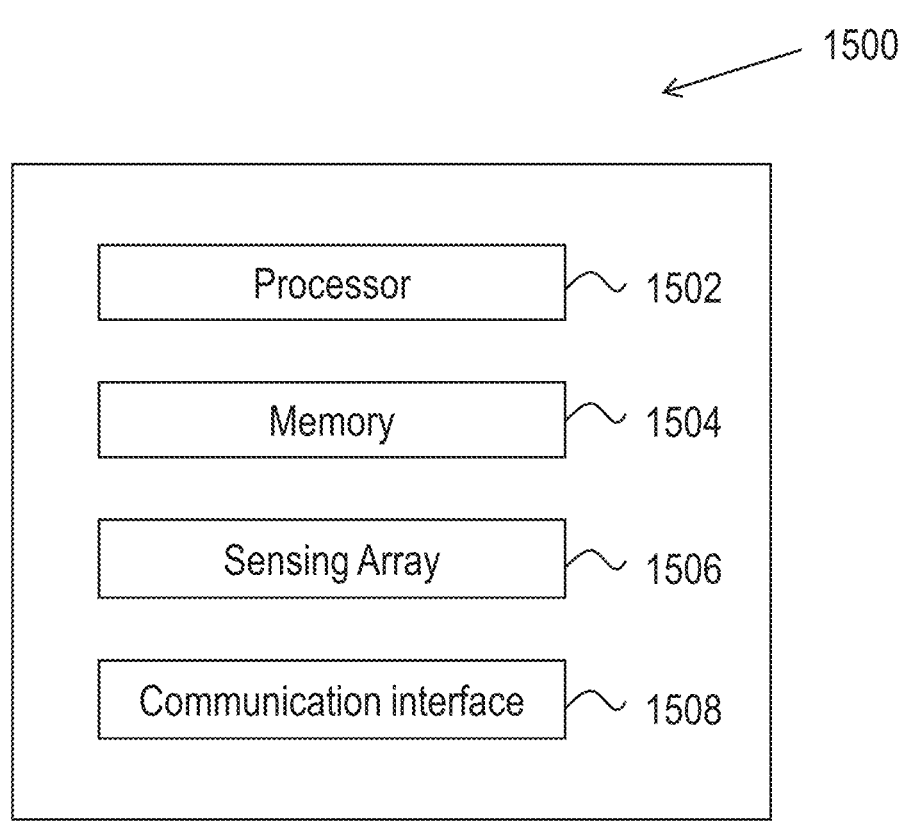
FIG. 15 shows an example of a hardware platform that can implement some techniques described in the present document.

FIG. 15 shows an example of a hardware platform 1500 that can be used to implement some of the techniques described in the present document. For example, the hardware platform 1500 may implement the methods 1300 or 1400 or may implement the various modules described herein. The hardware platform 1500 may include a processor 1502 that can execute code to implement a method. The hardware platform 1500 may include a memory 1504 that may be used to store processor-executable code and/or store data. The hardware platform 1500 may further include a sensing array 1506 and a communication interface 1508. For example, the sensing array 1506 may include a camera, various sensors (e.g., pressure, temperature, vibration) and/or an accelerometer. For example, the communication interface 1508 may implement one or more of the communication protocols (LTE, Wi-Fi, and so on) described.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, e.g., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the singular forms "a", "an" and "the" are intended to include the plural forms as well, unless the context clearly indicates otherwise. Additionally, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method to operate a water buoy data system to stabilize a vessel, the method comprising:

water buoys sensing wind characteristics and water characteristics at a location of the vessel;

the water buoys wirelessly transferring data messages that indicate the wind characteristics and the water characteristics at the location of the vessel for delivery to a computer system;

the computer system receiving the data messages wirelessly transferred by the water buoys that indicate the wind characteristics and the water characteristics at the location of the vessel;

the computer system determining wave forces based on the wind characteristics and the water characteristics at the location of the vessel; and the computer system indicating the wave forces to control vessel engine thrusters to counter the wave forces and stabilize the vessel.

2. The method of claim 1 wherein the computer system determining the wave forces based on the wind characteristics and the water characteristics at the location of the vessel comprises determining the wave forces based on pitch at the location of the vessel.

3. The method of claim 1 wherein the computer system determining the wave forces based on the wind characteristics and the water characteristics at the location of the vessel comprises determining the wave forces based on roll at the location of the vessel.

4. The method of claim 1 further comprising:

the water buoys generating electrical energy from water kinetics; and wherein the water buoys sensing the wind characteristics and the water characteristics and wirelessly transferring the data messages comprises using the electrical energy to sense the wind characteristics and the water characteristics and wirelessly transfer the data messages.

5. The method of claim 1 wherein:

the water buoys sensing the wind characteristics and the water characteristics at the location of the vessel and wirelessly transferring the data messages for delivery to the computer system comprises sensing the wind characteristics and the water characteristics at the location of the vessel and wirelessly transferring the data messages for delivery to the computer system when the vessel is being loaded; and the computer system receiving the data messages, determining the wave forces based on the wind characteristics and the water characteristics at the location of the vessel, and indicating the wave forces to control the vessel engine thrusters to counter the wave forces and stabilize the vessel comprises receiving the data messages, determining the wave forces based on the wind characteristics and the water characteristics at the location of the vessel, and indicating the wave forces to control the vessel engine thrusters to counter the wave forces and stabilize the vessel when the vessel is being loaded.

6. The method of claim 1 wherein:

the water buoys sensing the wind characteristics and the water characteristics at the location of the vessel and wirelessly transferring the data messages for delivery to the computer system comprises sensing the wind characteristics and the water characteristics at the location of the vessel and wirelessly transferring the data messages for delivery to the computer system when the vessel is being unloaded; and the computer system receiving the data messages, determining the wave forces based on the wind characteristics and the water characteristics at the location of the vessel, and indicating the wave forces to control the vessel engine thrusters to counter the wave forces and stabilize the vessel comprises receiving the data messages, determining the wave forces based on the wind characteristics and the water characteristics at the location of the vessel, and indicating the wave forces to control the vessel engine thrusters to counter the wave forces and stabilize the vessel when the vessel is being unloaded.

7. The method of claim 1 wherein:

the water buoys sensing the wind characteristics and the water characteristics at the location of the vessel and wirelessly transferring the data messages for delivery to the computer system comprises sensing the wind characteristics and the water characteristics at the location of the vessel and wirelessly transferring the data messages for delivery to the computer system when the vessel is not anchored; and the computer system receiving the data messages, determining the wave forces based on the wind characteristics and the water characteristics at the location of the vessel, and indicating the wave forces to control the vessel engine thrusters to counter the wave forces and stabilize the vessel comprises receiving the data messages, determining the wave forces based on the wind characteristics and the water characteristics at the location of the vessel, and indicating the wave forces to control the vessel engine thrusters to counter the wave forces and stabilize the vessel when the vessel is not anchored.

8. The method of claim 1 wherein the water buoys sensing the water characteristics at the location of the vessel comprises using an accelerometer to sense the water characteristics at the location of the vessel.

9. The method of claim 1 wherein the water buoys sensing the water characteristics at the location of the vessel comprises using a vibration sensor to sense the water characteristics at the location of the vessel.

10. A method to operate a water buoy data system to stabilize a vessel, the method comprising:

water buoys sensing wind characteristics and water characteristics at a location of the vessel;

the water buoys wirelessly transferring data messages that indicate the wind characteristics and the water characteristics at the location of the vessel for delivery to a computer system;

the computer system receiving the data messages wirelessly transferred by the water buoys that indicate the wind characteristics and the water characteristics at the location of the vessel;

the computer system determining pitch wave forces and roll wave forces based on the wind characteristics and the water characteristics at the location of the vessel;

the computer system indicating the pitch wave forces and roll wave forces to control vessel engine thrusters to counter the pitch wave forces and the roll wave forces and stabilize the vessel.

11. The method of claim 10 further comprising:

the water buoys generating electrical energy from water kinetics; and wherein the water buoys sensing the wind characteristics and the water characteristics and wirelessly transferring the data messages comprises using the electrical energy to sense the wind characteristics and the water characteristics and wirelessly transfer the data messages.

12. A water buoy data system to stabilize a vessel, the water buoy data system comprising:

water buoys configured to sense wind characteristics and water characteristics at a location of the vessel;

the water buoys configured to wirelessly transfer data messages that indicate the wind characteristics and the water characteristics at the location of the vessel for delivery to a computer system;

the computer system configured to receive the data messages wirelessly transferred by the water buoys that indicate the wind characteristics and the water characteristics at the location of the vessel;

the computer system configured to determine wave forces based on the wind characteristics and the water characteristics at the location of the vessel; and the computer system configured to indicate the wave forces to control vessel engine thrusters to counter the wave forces and stabilize the vessel.

13. The water buoy data system of claim 12 wherein the computer system is configured to determine the wave forces based on pitch at the location of the vessel to determining the wave forces based on the wind characteristics and the water characteristics at the location of the vessel.

14. The water buoy data system of claim 12 wherein the computer system is configured to determine the wave forces based on roll at the location of the vessel to determine the wave forces based on the wind characteristics and the water characteristics at the location of the vessel.

15. The water buoy data system of claim 12 further comprising:

the water buoys configured to generate electrical energy from water kinetics; and wherein the water buoys are configured to use the electrical energy to sense the wind characteristics and the water characteristics and wirelessly transfer the data messages to sense the wind characteristics and the water characteristics and wirelessly transfer the data messages.

16. The water buoy data system of claim 12 wherein:

the water buoys are configured to sense the wind characteristics and the water characteristics at the location of the vessel and wirelessly transfer the data messages for delivery to the computer system when the vessel is being loaded; and the computer system is configured to receive the data messages, determine the wave forces based on the wind characteristics and the water characteristics at the location of the vessel, and indicate the wave forces to control the vessel engine thrusters to counter the wave forces and stabilize the vessel when the vessel is being loaded.

17. The water buoy data system of claim 12 wherein:

the water buoys are configured to sense the wind characteristics and the water characteristics at the location of the vessel and wirelessly transfer the data messages for delivery to the computer system when the vessel is being unloaded; and the computer system is configured to receive the data messages, determine the wave forces based on the wind characteristics and the water characteristics at the location of the vessel, and indicate the wave forces to control the vessel engine thrusters to counter the wave forces and stabilize the vessel when the vessel is being unloaded.

18. The water buoy data system of claim 12 wherein:

the water buoys are configured to sense the wind characteristics and the water characteristics at the location of the vessel and wirelessly transfer the data messages for delivery to the computer system when the vessel is not anchored; and the computer system is configured to receive the data messages, determine the wave forces based on the wind characteristics and the water characteristics at the location of the vessel, and indicate the wave forces to control the vessel engine thrusters to counter the wave forces and stabilize the vessel when the vessel is not anchored.

19. The water buoy data system of claim 12 wherein the water buoys are configured to use an accelerometer to sense the water characteristics at the location of the vessel.

20. The water buoy data system of claim 12 wherein the water buoys are configured to use a vibration sensor to sense the water characteristics at the location of the vessel.

* * * * *